United States Patent [19]

Sambe et al.

[11] 4,167,026
[45] Sep. 4, 1979

[54] INFORMATION REPRODUCING AND RECORDING APPARATUS FOR RECORDING ON TAPE FROM A PHONOGRAPH RECORD

[75] Inventors: Yusuke Sambe; Nobuo Kanoi, both of Tokyo, Japan

[73] Assignee: Aiwa Co., Ltd., Tokyo, Japan

[21] Appl. No.: 869,914

[22] Filed: Jan. 16, 1978

Related U.S. Application Data

[63] Continuation-in-part of Ser. No. 797,376, Jul. 7, 1975, abandoned, which is a continuation of Ser. No. 593,441, Jul. 7, 1975, abandoned.

[30] Foreign Application Priority Data

| Jul. 6, 1974 | [JP] | Japan | 49-77525 |
| Jul. 6, 1974 | [JP] | Japan | 49-77526 |
| Jul. 6, 1974 | [JP] | Japan | 49-77527 |
| Jul. 6, 1974 | [JP] | Japan | 49-77528 |

[51] Int. Cl.$^2$ .................. G11B 5/86; G11B 11/00
[52] U.S. Cl. ........................................ 360/15; 194/15; 360/79; 179/100.1 A
[58] Field of Search ............ 360/15, 73, 71, 97, 360/79, 74, 62; 179/100.1 R, 100.1 A; 194/15; 235/449; 274/3

[56] References Cited

U.S. PATENT DOCUMENTS

| 2,625,611 | 1/1953 | Roberts | 360/97 |
| 3,206,555 | 9/1965 | Huppert | 179/100.1 A |
| 3,324,281 | 6/1967 | Morse | 360/79 |
| 3,711,658 | 1/1973 | Ward | 179/100.1 A |
| 3,906,169 | 9/1975 | Iwase et al. | 360/79 |
| 3,990,710 | 11/1976 | Hughes | 360/15 |

*Primary Examiner*—Alfred H. Eddleman
*Attorney, Agent, or Firm*—Marshall & Yeasting

[57] ABSTRACT

Information reproducing and recording apparatus is disclosed which has a tape recorder mechanism, a disc recorder mechanism and an electric circuit for reproducing and recording and in which information obtained from the disc recorder mechanism is recorded on the side of the tape recorder mechanism in the state that the tape recorder mechanism and the disc recorder mechanism are in constant-speed forwarding and reproducing modes of operation, respectively. Switching of the disc recorder from a non-reproducing mode to the reproducing mode of operation is detected and, based on the detecting signal, the tape recorder mechanism is automatically changed over from a stop mode to the constant-speed forwarding mode of operation. Switching of the tape recorder mechanism from the stop mode to the constant-speed forwarding mode of operation is detected and, based on the detecting signal, the disc recorder mechanism is automatically altered from the non-reproducing mode to the reproducing mode of operation. Further, switching of the tape recorder mechanism from the constant-speed forwarding mode to, for example, the stop mode of operation is detected and, based on the detecting signal, the disc recorder mechanism is automatically switched from the reproducing mode to the non-reproducing mode of operation. Still further, switching of the disc recorder mechanism from the reproducing mode to the non-reproducing mode of operation is detected and, based on the detecting signal, the tape recorder mechanism is automatically switched from the constant-speed forwarding mode to the stop mode of operation, for example.

2 Claims, 11 Drawing Figures

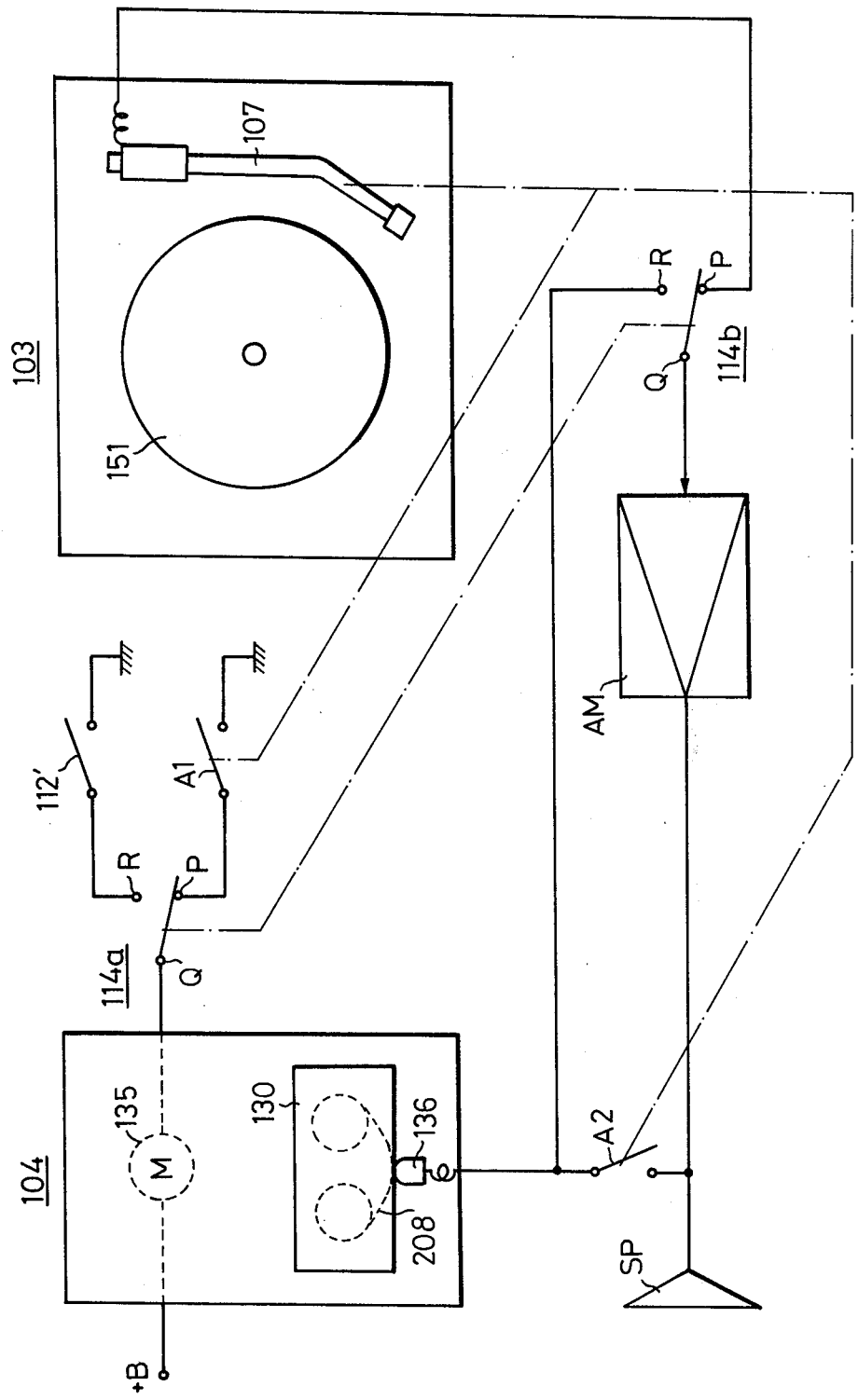

ced and recording apparatus which is provided with at least a tape recorder mechanism, a disc recorder mechanism and an electric circuit and in which the tape recorder mechanism is adapted to be selectively switched by the control of a tape recorder drive control mechanism to at least a constant-speed forwarding mode of operation that a tape-like record medium is transferred at a constant speed in a manner to permit recording thereon of information by a transducer, and at least one of modes of operation except the constant-speed forwarding mode of operation such as a stop mode that the transfer of the tape-like record medium is stopped, a high-speed transfer mode of operation that the tape-like record medium is transferred at high speed and so on; the disc recorder mechanism is adapted to be selectively switched by a disc recorder drive control mechanism to a reproducing mode of operation that information is reproduced by a transducer from a disc-shaped record medium driven at a constant speed and a non-reproducing mode of operation that the information recorded on the disc-shaped record medium is not reproduced by the transducer; and the electric circuit is adapted to supply the transducer of the tape recorder mechanism with the information reproduced by the transducer of the disc recorder mechanism when the tape recorder mechanism and the disc recorder mechanism are in the constant-speed forwarding and reproducing modes of operation, respectively.

INFORMATION REPRODUCING AND RECORDING APPARATUS FOR RECORDING ON TAPE FROM A PHONOGRAPH RECORD

CROSS-REFERENCE TO RELATED APPLICATION

This is a continuation-in-part of application Ser. No. 797,376 filed 7/7/75, now abandoned, which is a continuation of application Ser. No. 593,441 filed July 7, 1975, now abandoned.

BACKGROUND OF THE INVENTION

Field of the Invention

This invention relates to improvements in information reproducing and recording apparatus which is provided with at least a tape recorder mechanism, a disc recorder mechanism and an electric circuit and in which the tape recorder mechanism is adapted to be selectively switched by the control of a tape recorder drive control mechanism to at least a constant-speed forwarding mode of operation that a tape-like record medium is transferred at a constant speed in a manner to permit recording thereon of information by a transducer, and at least one of modes of operation except the constant-speed forwarding mode of operation such as a stop mode that the transfer of the tape-like record medium is stopped, a high-speed transfer mode of operation that the tape-like record medium is transferred at high speed and so on; the disc recorder mechanism is adapted to be selectively switched by a disc recorder drive control mechanism to a reproducing mode of operation that information is reproduced by a transducer from a disc-shaped record medium driven at a constant speed and a non-reproducing mode of operation that the information recorded on the disc-shaped record medium is not reproduced by the transducer; and the electric circuit is adapted to supply the transducer of the tape recorder mechanism with the information reproduced by the transducer of the disc recorder mechanism when the tape recorder mechanism and the disc recorder mechanism are in the constant-speed forwarding and reproducing modes of operation, respectively.

DESCRIPTION OF THE PREFERRED EMBODIMENTS

In conventional information reproducing and recording apparatus of this kind, in the case of supplying the reproduced information from the transducer of the disc recorder mechanism to the transducer of the tape recorder mechanism for recording on the tape-like record medium, an electric or mechanical reproducing mode input produced by manual operation is applied to the disc recorder drive control mechanism of the disc recorder mechanism to thereby switch the disc recorder mechanism from the non-reproducing mode to the reproducing mode of operation and, at the same time as or immediately before or after the application of the abovesaid input, an electric or mechanical input similarly produced by manual operation is applied to the tape recorder drive control mechanism of the tape recorder mechanism to thereby switch the tape recorder mechanism from the stop mode to the constant-speed forwarding mode of operation. Alternatively, an electric or mechanical input produced by manual operation is applied to the tape recorder drive control mechanism of the tape recorder mechanism to thereby change over the tape recorder mechanism from the stop mode to the constant-speed forwarding mode of operation and, at the same time as or immediately before or after the application of the above input, an electric or mechanical reproducing mode input produced by manual operation is applied to the disc recorder drive control mechanism of the disc recorder mechanism to thereby change over the disc recorder mechanism from the non-reproducing mode to the reproducing mode of operation.

Therefore, the operation for recording the reproduced information from the disc recorder mechanism on the tape-like record medium of the tape recorder mechanism is very troublesome. Further, there is the possibility that one part of the reproduced information from the disc recorder mechanism is not recorded on the record medium of the tape recorder mechanism or that recording of the reproduced information from the disc recorder mechanism does not start from a predetermined position on the record medium of the tape recorder mechanism.

Further, in this kind of information reproducing and recording apparatus, when the state in which the disc recorder mechanism and the tape recorder mechanism are in the reproducing and constant-speed forwarding modes of operation, respectively, and the reproduced information from the transducer of the disc recorder mechanism is supplied to the transducer of the tape recorder mechanism and recorded on the tape-like record medium, is changed over to the state in which the tape recorder mechanism is in one of the modes of operation except the constant-speed forwarding mode of operation on the tape recorder mechanism is in the constant-speed forwarding mode of operation but aforesaid electric circuit does not supply the information therefrom to the transducer of the tape recorder mechanism, it is desired to switch the disc recorder mechanism to the non-reproducing mode. In the conventional information reproducing and recording apparatus, however, the disc recorder mechanism is switched to the non-reproducing mode by manually controlling the disc recorder drive control mechanism of the disc recorder mechanism. This inevitably introduces complexity in the operation for switching the disc recorder mechanism to the non-reproducing mode when the apparatus is switched from the state of the information from the disc recorder mechanism being recorded on the side of the tape recorder mechanism to the state in which the tape recorder mechanism is in one of the modes other than the constant-speed forwarding mode or no information is supplied to the transducer of the tape recorder mechanism.

Moreover, in this kind of information reproducing and recording apparatus, when the state in which the disc recorder mechanism and the tape recorder mechanism are in the reproducing and constant-speed forwarding modes of operation, respectively, and the reproduced information from the transducer of the disc recorder mechanism is supplied to the transducer of the tape recorder mechanism and recorded on the tape-like record medium, is changed over to the state of no information being reproduced on the side of the disc recorder mechanism, that is, the state of the disc recorder mechanism being in the non-reproducing mode of operation, it is desired to switch the tape recorder mechanism from the constant-speed forwarding mode to one of the stop, high-speed transfer and other modes except the constant-speed forwarding mode and to control the electric circuit not to supply information therefrom to the transducer of the tape recorder mechanism held in the constant-speed forwarding mode. In the conventional information reproducing and recording apparatus, however, the above desired operations are achieved by manually controlling the tape recorder drive control mechanism of the tape recorder mechanism or the electric circuit. This inevitably introduces complexity in the operation for switching the tape recorder mechanism to one of the modes of operation except the constant-speed forwarding mode or controlling the electric circuit not to supply information therefrom to the transducer of the tape recorder mechanism. In addition, the tape recorder mechanism is changed over to one of the modes of operation except the constant-speed forwarding mode an uncertain period of time after the instant when the disc recorder mechanism has been put in the non-reproducing mode or the electric circuit is controlled similarly after an uncertain period of time not to supply the information therefrom to the transducer of the tape recorder mechanism. As a result of this, there is the possibility that the information recorded on the tape-like record medium is unnecessarily erased in the above case.

SUMMARY OF THE INVENTION

Accordingly, one object of this invention is to provide novel information reproducing and recording apparatus of this kind which is designed so that the information obtained from the disc recorder mechanism can be faithfully recorded on the record medium of the tape recorder mechanism without involving the aforementioned troublesome operations.

Another object of this invention is to provide novel information reproducing and recording apparatus of this kind which is adapted so that where the state of the reproduced information from the disc recorder mechanism being recorded on the tape-like record medium of the tape recorder mechanism is switched to the state of the tape recorder mechanism being in one of the modes of operation other than the constant-speed forward mode or the state of no information being supplied to the transducer of the tape recorder mechanism, the disc recorder mechanism can be switched to the non-reproducing mode without involving the aforesaid troublesome operations.

Still another object of this invention is to provide novel information reproducing and recording apparatus of this kind which is constructed so that where the state of the reproduced information from the disc recorder mechanism being recorded on the tape-like record medium of the tape recorder mechanism is changed over to the state of the disc recorder mechanism being in the reproducing mode, the tape recorder mechanism can be switched to one of the modes of operation other than the constant-speed forwarding mode or the electric circuit can be controlled not to supply therefrom information to the transducer of the tape recorder mechanism without involving the aforementioned troublesome operations.

Other objects, features and advantages of this invention will become apparent from the following description taken in conjunction with the accompanying drawings.

BRIEF DESCRIPTION OF THE DRAWINGS

FIG. 11 is a schematic diagram showing the interdependent relationship between the phonograph a record player and the recorder according to this invention.

DESCRIPTION OF THE PREFERRED EMBODIMENTS

Figure 1:
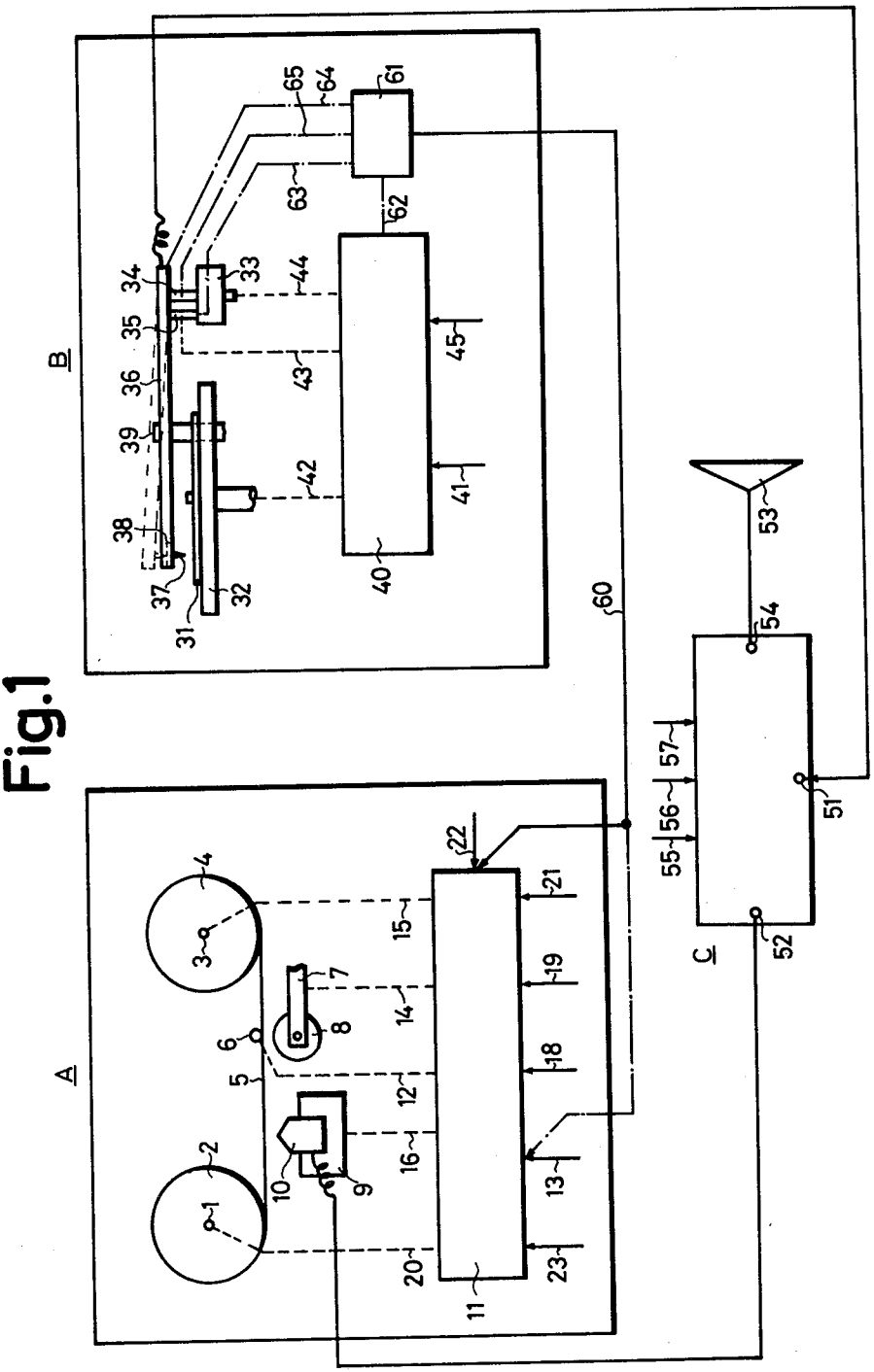
FIGS. 1 to 4 are schematic diagrams illustrating embodiments of this invention.

FIG. 1 illustrates one example of the information reproducing and recording apparatus of this invention which is composed of a tape recorder mechanism and a disc recorder mechanism. The tape recorder mechanism is an acoustic magnetic tape recorder mechanism which employs a magnetic tape as a tape-like record medium and a magnetic head as a transducer and is adapted to handle an acoustic signal as information. The disc recorder mechanism is the so-called acoustic record player which employs a disc record having a sound groove cut therein as a disc-shaped record medium and a transducer associated with a stylus mounted on the free end of a tone arm and is designed to handle an acoustic signal as information.

In FIG. 1, reference character A indicates generally the acoustic magnetic tape recorder mechanism; B designates generally the acoustic record player mechanism; and C identifies an electric circuit.

The acoustic magnetic tape recorder mechanism A is a conventional tape recorder and reproducer such as is shown in detail in U.S. Pat. No. 3,609,844 issued Oct. 5, 1971, modified by the addition of a pause control described in detail in U.S. Pat. No. 3,659,859 issued May 2, 1972. Such a conventional tape recorder comprises, for example, a supply and a take-up reel 2 and 4 mounted on a supply and a take-up reel shaft 1 and 3, respectively; a magnetic tape 5 extending between the supply and take-up reels 2 and 4; a capstan 6; a pinch roller 8 mounted on pinch roller arm 7; a magnetic head 10 disposed on a sliding plate 9; and so on. The acoustic magnetic tape recorder mechanism A is adapted to obtain the following modes of operation by the following drive controls of the supply reel shaft 1, the take-up reel shaft 3, the capstan 6, the pinch roller arm 7, the sliding plate 9, etc. with a tape recorder drive control mechanism 11.

When the drive control mechanism 11 is in its original state in which it is only supplied with a power source, the capstan 6 is driven through a coupling mechanism 12 but the supply and take-up reel shafts 1 and 3 are not driven and the pinch roller 8 is not in rotary contact with the capstan 6 and, further, the magnetic head 10 is held apart from the magnetic tape 5. Consequently, the magnetic tape 5 is held in its standstill state while being disengaged from the magnetic head 5. Such a state will hereinafter be referred to as the stop mode.

When an electric or mechanical input 13 for a constant-speed forwarding mode of operation is supplied to the drive control mechanism 11 in the abovesaid stop mode, the pinch roller arm 7 is actuated through a coupling mechanism 14 to bring the pinch roller 8 into rotary contact with the capstan 6 with the magnetic tape 5 being gripped therebetween. Thus, the magnetic tape 5 is drawn out from the side of the supply reel 2 and supplied to the side of the take-up reel 4. Further, the take-up reel shaft 3 is driven through a coupling mechanism 15 so that the take-up reel 4 takes up the magnetic tape 5 paid out from the side of the supply reel 2 to the side of the take-up reel 4 by the cooperation of the capstan 6 and the pinch roller 8. Moreover, the sliding plate 9 is actuated through a coupling mechanism 16 to bring the magnetic head 10 into contact with magnetic tape 5. In this manner, the constant-speed forwarding mode is obtained in which the magnetic tape 5 held in contact with the magnetic head 10 is transferred at a constant speed from the side of the supply reel 2 to the side of the take-up reel 4.

When an electric or mechanical input 18 for fast forwarding mode of operation is applied to the drive control mechanism 11 in the stop mode, the take-up reel shaft 3 is driven at high speed through the coupling mechanism 15 so that the magnetic tape 5 is transferred at high speed from the side of the supply reel 2 to the side of the take-up reel 4 and taken up on the take-up reel 4. Thus, the fast forwarding mode is obtained in which the magnetic tape 5, held out of contact with magnetic head 10 in this case, is transferred at high speed from the side of the supply reel 2 to the side of the take-up reel 4.

When an electric or mechanical input 19 for the rewinding mode of operation is supplied to the drive control mechanism 11 in the stop mode, the supply reel shaft 1 is driven at high speed through a coupling mechanism 20 so that the magnetic tape 5 is transferred at high speed from the side of the take-up reel 4 to the side of the supply reel 2 and wound on the supply reel 2. In this manner, the rewinding mode of operation is obtained in which the magnetic tape 5, held out of contact with the magnetic head 10 in this case, is transferred at high speed from the side of the take-up reel 4 to the side of the supply reel 2.

When the abovesaid constant-speed forwarding mode input 13 and an electric or mechanical input 21 for the transfer stop mode of operation are applied simultaneously or one after another to the drive control mechanism 11 in the stop mode, the pinch roller 7 is actuated through the coupling mechanism 14 to bring the pinch roller 8 to such a position where it is slightly spaced apart from the capstan 6. On the other hand, the sliding plate 9 is actuated through the coupling mechanism 16 to bring the magnetic head 10 into contact with the magnetic tape 5. Thus, the temporary stop mode (the so-called pause mode) is obtained in which the acoustic magnetic tape recorder mechanism A is temporarily out of operation immediately before switched into the constant-speed forwarding mode.

When an electric or mechanical input 22 for releasing the abovesaid temporary stop mode is applied to the drive control mechanism 11 in the temporary stop mode, the temporary stop mode is released and the aforesaid constant-speed forwarding mode is obtained.

Further, when an electric or mechanical input 23 for the stop mode of operation is supplied to the drive control mechanism 11 in the abovesaid constant-speed forwarding, fast forwarding, rewinding or temporary stop mode, the above-described stop mode is obtained.

The abovementioned constant-speed forwarding, fast forwarding, rewinding and transfer stop mode inputs 13, 18, 19 and 21 and the temporary stop mode releasing input 22 can be obtained as mechanical inputs respectively, for example, by depressing push buttons provided corresponding to the inputs, respectively. If electrical switches are associated with such push buttons respectively, the abovesaid inputs can be obtained in the form of electric inputs.

The acoustic record player mechanism B is a conventional record player such as is shown in detail in U.S. Pat. No. 3,697,087 issued Oct. 10, 1972. Such a record player comprises, for example, a turntable 32 rotating with an ordinary disc record 31 placed thereon; a tone arm 36 mounted on a rotary shaft 34 of a tone arm mounting mechanism 33 and adapted to be rotatable together with the rotary shaft 34 and rotatable about the position of the free end of the rotary shaft 34 so that the free end of the tone arm 36 may be raised or lowered by an arm lift member 35 of the tone arm mounting mechanism 33; a stylus 37 attached to the free end of the tone arm 36; a transducer 38 associated with the stylus 37; a tone arm rest 39; and so on. The acoustic record player mechanism B is designed so that such modes of operation as will hereinbelow be described are obtained by controlling the turntable 32, the rotary shaft 34 and the arm lift member 35 of the tone arm mounting mechanism 33 with a record player drive control mechanism 40 as described hereinbelow.

When the drive control mechanism 40 is in its original state in which it is merely supplied with a power source, the turntable 32 is not driven and the arm lift member 35 lies at its lowered position and, further, the tone arm 36 stays on the rest 39. Accordingly, in this state, an acoustic signal recorded on the record 31 is not played back by the transducer 38. Such a state will hereinafter be referred to as the non-reproducing mode.

When an input 41 for the reproducing mode of operation is applied to the drive control mechanism 40 in the abovesaid non-reproducing mode, the turntable 32 is driven at a constant speed through a coupling mechanism 42. The arm lift member 35 is pushed up through a coupling mechanism 43 to bring up the tone arm 36 from the rest 39. Further, the rotary shaft 34 is rotated through a coupling mechanism 44 to bring the stylus 37 to the position corresponding to a predetermined position of start of the record 31 placed on the turntable 32. Next, the arm lift member 35 is lowered through the coupling mechanism 43 to bring the stylus 37 of the tone arm 36 into engagement with the sound groove of the record 31 at the predetermined position of the start thereof. Thereafter, the rotary shaft 34 is set free in rotational movement so that it may freely rotate toward a predetermined position of termination of the sound groove of the record 31 with the rotation of the turntable 32 and consequently the record 31, with the stylus 37 of the tone arm 36 being held in engagement with the groove under a predetermined stylus pressure. Consequently, the reproducing mode of operation is obtained in which acoustic signals recorded in the sound groove of the record 31 driven at a constant speed are reproduced by the transducer 38 associated with the stylus 37.

Further, when the tone arm 36 is greatly rotated or swung upon engagement of the stylus 37 with the sound groove at the predetermined position of termination of the record 31 (no acousting signal being recorded in the sound groove at this position), this rotational movement is detected and the arm lift member 35 is raised through the coupling mechanism 43 to bring up the tone arm 36 to disengage its stylus 37 from the record 31. Then, the rotary shaft 34 is turned through the coupling mechanism 44 to bring the tone arm 36 to the position right above the rest 39. Thereafter, the arm lift member 35 is lowered through the coupling mechanism 43 to bring down the tone arm 36 onto the rest 39 and, based on this operation, the rotation of the turntable 32 is stopped through the coupling mechanism 42, thus obtaining the abovesaid non-reproducing mode.

Moreover, when an input 45 for the non-reproducing mode of operation is applied to the drive control mechanism 40 in the above-described reproducing mode, the arm lift member 35, the rotary shaft 34 and the turntable 32 perform the same operations as those in the above-described case where the tone arm 36 is greatly turned upon engagement of the stylus 37 with the non-recorded sound groove at the predetermined position of termination of the record 31, and consequently the non-reproducing mode described above is obtained.

The aforesaid reproducing and non-reproducing mode inputs 41 and 45, can be obtained by pressing push-buttons provided corresponding thereto respectively or rotating a rotary knob between two positions. If electric switches are associated with such push-buttons or rotary knob, the abovesaid inputs can be obtained in the form of electric inputs.

The foregoing has described a conventional magnetic tape recorder, mechanism A, and a conventional record player, mechanism B. These as illustrated in U.S. Pat. No. 2,625,611 issued Jan. 13, 1953, are conventionally connected together with a switching circuit so that the output of either mechanism may be fed through an amplifier to a speaker, or so that the record player output may be supplied as an input to the tape recorder to be recorded either with the speaker operating as a monitor or not. The electric circuit C is such a switching circuit. The electric circuit C has, for example, an input terminal 51 connected to the transducer 38 disposed on the free end of the tone arm 36 of the record player mechanism B, an input/output terminal 52 connected to the magnetic head 10 of the magnetic tape recorder mechanism A and another output terminal 54 connected to a speaker 53. When an input 55 for the reproducing mode of operation for the magnetic tape recorder mechanism A is applied to the electric circuit C being supplied with a power source, if the magnetic tape recorder mechanism A is in the abovesaid constant-speed forwarding mode and if the acoustic signal recorded on the magnetic tape 5 is being reproduced by the magnetic head 10, the reproduced signal is amplified and then supplied to the speaker 53. This is the reproducing mode of operation for the magnetic tape recorder mechanism.

Further, when an input 56 for the reproducing mode of operation for the record player mechanism B is applied to the electric circuit C supplied with the power source, if the record player mechanism B is in the abovesaid reproducing mode and if the acoustic signal recorded on the record 31 is being played back by the transducer 38, the reproduced signal is amplified and then supplied to the speaker 53. This is the reproducing mode of operation for the record player mechanism B.

Moreover, when an input 57 for the recording mode of operation is applied to the electric circuit C supplied with the power source, if the record player mechanism B is in the aforementioned reproducing mode and if the acoustic signal recorded on the record 31 is being played back by the transducer 38, the played-back signal is amplified and then supplied through the input-/output terminal 52 to the magnetic head 10 of the magnetic tape recorder mechanism A and, if necessary, to the speaker 53, too. Accordingly, in this case, if the magnetic tape recorder mechanism A is in the aforesaid constant-speed forwarding mode, the acoustic signal derived from the record player mechanism B is recorded on the magnetic tape 5 of the magnetic tape recorder mechanism A, if necessary, while being monitored through the speaker 53. This is the recording mode of operation.

The aforementioned input 55 for the reproducing mode of operation for the magnetic tape recorder mechanism A, the input 56 for the reproducing mode of operation for the record player mechanism B and the input 57 for the recording mode of operation can be obtained by pressing push-buttons provided respectively corresponding inputs or changing over a change-over switch.

The foregoing description has clarified the construction of one example of each of the magnetic tape recorder mechanism A, the record player mechanism B and the electric circuit C. With such arrangements as described in the foregoing, when the magnetic tape recorder mechanism A and the record player mechanism B are in the stop and the non-reproducing modes, respectively and the electric circuit C is in the recording mode, if the constant-speed forwarding mode input 13 is applied to the drive control mechanism 11 of the magnetic tape recorder mechanism A and if the reproducing mode input 41 is applied to the drive control mechanism 40 of the record player mechanism B substantially at the same time as the abovesaid input 13, the magnetic tape recorder mechanism A is put in the constant-speed forwarding mode and the record player mechanism B is altered into the reproducing mode. As a result of this, the acoustic signal recorded on the record 31 is reproduced by the transducer 38 of the record player mechanism B and the reproduced signal is supplied through the electric circuit C to the magnetic head 10 of the magnetic tape recorder mechanism A and, if necessary, to the speaker 53, by which the signal is recorded on the magnetic tape 5, if necessary, while being monitored through the speaker 53.

Further, when the magnetic tape recorder mechanism A, the record player mechanism B and the electric circuit C are in the temporary stop, non-reproducing and recording modes, respectively, if the temporary stop mode releasing input 22 and the reproducing mode input 41 are simultaneously applied to the drive control mechanisms 11 and 40 of the magnetic tape recorder mechanism A and the record player mechanism B, respectively, the magnetic tape recorder mechanism A and the record player mechanism B are altered into the constant-speed forwarding and reproducing modes, respectively. Consequently, the acoustic signal from the record player mechanism B is recorded on the magnetic tape 5 of the magnetic tape recorder mechanism A, if necessary, while being monitored through the speaker 53, as described above.

The state in which the acoustic signal from the record player mechanism B is recorded in the magnetic tape recorder mechanism A is released by the application of either one or both of the stop and non-reproducing mode inputs 23 and 45 to the drive control mechanisms 11 and 40 of the magnetic tape recorder and record player mechanisms A and B, respectively.

When the acoustic signal from the record player mechanism B is being recorded on the side of the magnetic tape recorder mechanism A, if the stop mode input 23 is applied to the drive control mechanism 11 of the magnetic tape recorder mechanism A, the magnetic tape recorder mechanism A is put in the stop mode. And if the fast forwarding mode input 18 is applied, the fast forwarding mode is obtained; if the rewinding mode input 19 is applied, the rewinding mode is obtained; and if the temporary stop mode input 21 is applied, the temporary stop mode is obtained. In any case, the magnetic tape recorder magnetic mechanism A is released from the abovesaid recording state. Further, the reproducing mode input 55 for the magnetic tape recorder mechanism is applied to the electric circuit C, the electric circuit C is put in the reproducing mode for the magnetic tape recorder mechanism and if the reproducing mode input 56 for the record player mechanism is applied, the electric circuit C is put in the reproducing mode for the record player mechanism. In either case, the aforesaid recording state is similarly removed.

Further, when the record player mechanism B is in the reproducing mode, if the non-reproducing mode input 45 is applied to the drive control mechanism 40, the record player mechanism B is altered into the aforesaid non-reproducing mode, as described previously.

Since the above arrangements are employed in conventional constructions composed of acoustic magnetic tape recorder and acoustic record player mechanisms and an electric circuit, too, no further detailed description will be given.

In the embodiment of this invention shown in FIG. 1, there is provided, in the record player mechanism B, means 61 for obtaining information 60 indicative of switching of the record player mechanism B from the non-reproducing mode to the reproducing mode. In practice, the means 61 can be constructed at will, for example, as indicated by reference numerals 62 to 65 in FIG. 1. Namely, in the case of reference numeral 62, the means 61 is associated with the record player drive control mechanism 40 to electrically or mechanically detect the reproducing mode input 41 thereto. In the case of reference numeral 63, it is associated with the lift arm member 35 to electrically or mechanically detect first rising or lowering movement thereof. In the case of reference numeral 64, it is associated with the tone arm 36 to electrically or mechanically detect first rising movement thereof from the rest 39 or first lowering from its raised position or the rotational movement of the tone arm 36 to bring the stylus 37 toward or to the position right above the start position of the sound groove of the record 31. Further, in the case of reference numeral 65, it is associated with the rotary shaft 34 to electrically or mechanically detect the rotational movement thereof to bring the stylus 37 toward or to the position right above the start position of the sound groove of the record 31.

The information 60 thus obtained by the means 61 is applied to the drive control mechanism 11 of the magnetic tape recorder mechanism A as an input equal to the aforesaid temporary stop mode releasing input 22.

The above is the construction of one embodiment of this invention. With such a construction, when the reproducing mode input 41 is applied to the drive control mechanism 40 of the record player B in the state that the magnetic tape recorder mechanism A, the record player mechanism B and electric circuit C are in the temporary stop, non-reproducing and recording modes of operation, respectively, the record player mechanism B is switched to the reproducing mode and the information 60 indicative of the switching is obtained from the detecting means 61. The information 60 thus obtained is applied to the drive control mechanism 11 of the magnetic tape recorder mechanism A as an input equal to the temporary stop mode releasing input 22, by which the magnetic tape recorder mechanism A is switched from the temporary stop mode to the constant-speed forwarding mode of operation. As a result of this, the acoustic signal reproduced by the transducer 38 of the record player mechanism B is applied through the electric circuit C to the magnetic head 10 of the magnetic tape recorder mechanism A and thus recorded on the magnetic tape 5.

With the FIG. 1 embodiment of this invention described above, only by applying the reproducing mode input 41 to the record player mechanism B when the magnetic tape recorder mechanism A, the record player mechanism B and the electric circuit C are in the temporary stop, non-reproducing and recording modes of operation, respectively, the magnetic tape recorder mechanism A is automatically altered into the constant-speed forwarding mode and the acoustic signal played back and supplied from the side of the record player mechanism B is automatically recorded on the side of the magnetic tape recorder mechanism A.

Thus, the operation for recording the reproduced acoustic signal obtained from the record player mechanism B on the side of the magnetic tape recorder mechanism A is extremely simplified. At the same time, since the magnetic tape recorder mechanism A is put in the constant-speed forwarding mode at the instant of the application of the reproducing mode input 41 to the record player mechanism B or at an instant a predetermined period of time after the abovesaid instant. Therefore, it is possible to effectively avoid the possibilities that one part of the reproduced acoustic signal from the record player mechanism B is not recorded on the magnetic tape 5 or that recording of the acoustic signal on the magnetic tape 5 does not start from a predetermined position thereon.

The FIG. 1 embodiment of this invention has been described in connection with the case where the information 60 from the detecting means 61 on the side of the record player mechanism B is applied to the drive control mechanism 11 on the side of the magnetic tape recorder mechanism A as an input equal to the temporary stop mode releasing input 22. However, it is also possible to apply the information 60 to the drive control mechanism 11 of the magnetic tape recorder mechanism A as an input equal to the constant-speed forwarding mode input 13, as indicated by the chain line in FIG. 1. It will be evident that, in such a case, the same results as those in the above case can be obtained by applying the reproducing mode input 41 to the drive control mechanism 40 of the record player mechanism B in the state that the magnetic tape recorder mechanism A, the record player mechanism B and the electric circuit C are in the stop, non-reproducing and recording modes of operation, respectively.

Further, the FIG. 1 embodiment of this invention has been described with regard to the case where the reproducing mode is obtained as a whole only by applying the reproducing mode input 41 to the drive control mechanism 40 of the record player mechanism B. However, even if the record player mechanism B is contructed so that the turntable 32 is driven by the application of a first input and that the tone arm 36 is then driven by the application of a second input to perform the series of operations—rising from the rest 39, rotation toward the record 31 and lowering toward the sound groove of the record 31—to obtain the reproducing mode as a whole, or even if the record player mechanism B is designed such that the turntable 32 is driven by the application of the first input, that the tone arm 36 is raised by the application of the second input from the rest 39 and turned to bring the stylus 37 to a predetermined position above the record 31 and that, by the application of a third input after the application such first and second inputs, the tone arm 36 is lowered from the predetermined position to bring the stylus 37 into engagement with the sound groove of the record 31 to provide the reproducing mode as a whole, the concept of this invention described above can be applied.

Figure 2:
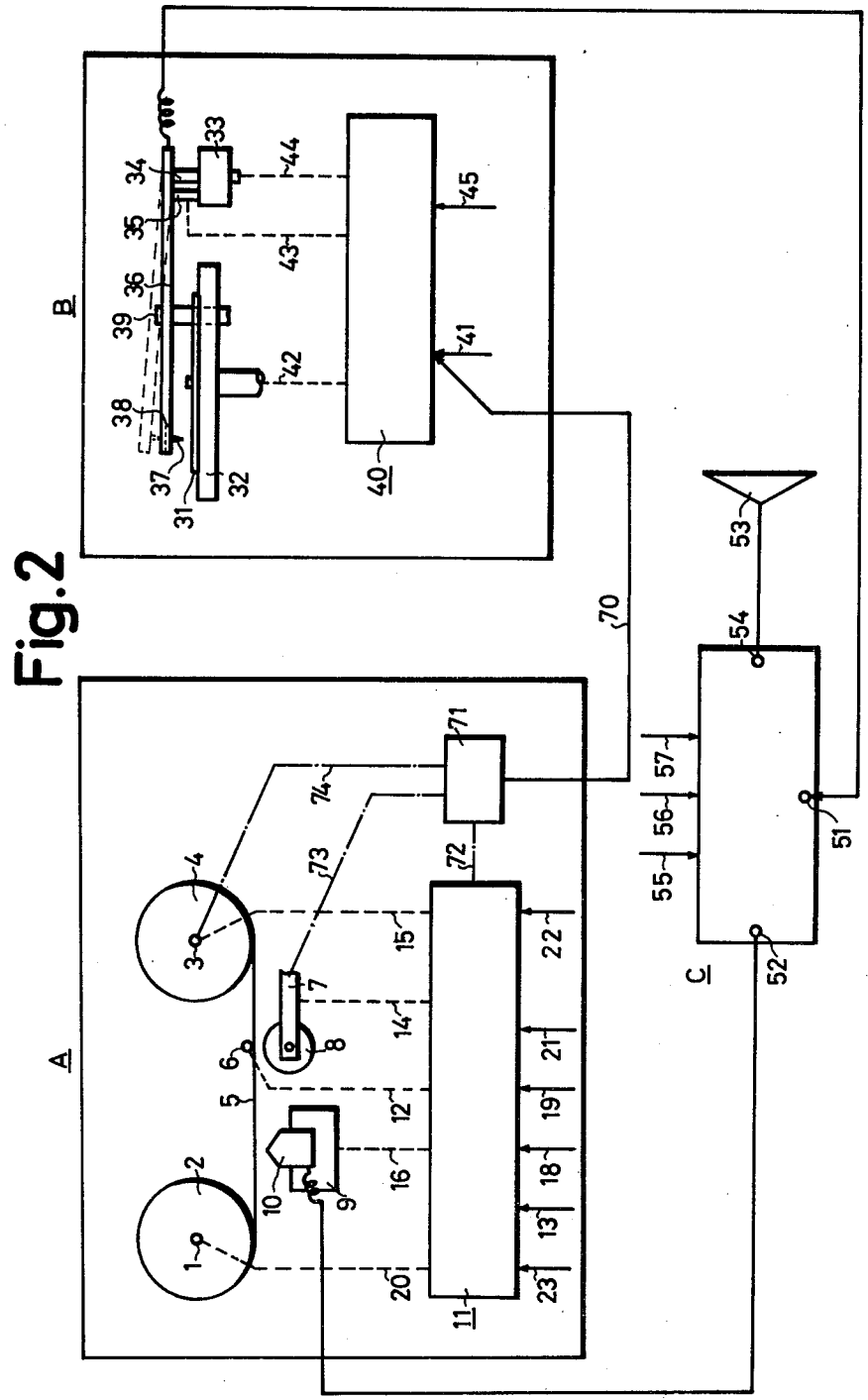

FIG. 2 illustrates another embodiment of this invention, in which parts corresponding to those in FIG. 1 are identified by the same reference numerals and characters and no detailed description will be repeated in connection with them. In this embodiment, there are omitted the means 61 and the mechanisms 62 to 65 associating it with the drive control mechanism 40, the arm lift member 35, the tone arm 36 and the rotary shaft 34, respectively, in the construction described previously with regard to FIG. 1. However, there is provided on the side of the magnetic tape recorder mechanism A a means 71 for obtaining information 70 indicative of switching of the magnetic tape recorder mechanism A from the temporary stop mode to the constant-speed forwarding mode of operation. In practice, the means 71 can be constructed at will, for example, as indicated by reference numerals 72 to 74. Namely, where the means 71 is associated with the drive control mechanism 11 as indicated by 72, it electrically or mechanically detects the temporary stop mode releasing input 22 to the drive control mechanism 11; where associated with the pinch roller arm 7 as indicated by 73, the means 71 electrically or mechanically detects the actuation of the pinch roller arm 7 from its position in the temporary stop mode to bring the pinch roller 8 into rotary contact with the capstan 6; and, further, where associated with the take-up reel shaft 3 as indicated by 74, the means 71 electrically or mechanically detects the rotation of the take-up reel shaft 3 having been held in the temporary stop mode.

The information 70 obtained from the means 71 is applied to the drive control mechanism 40 of the record player mechanism B as an input equal to the reproducing mode input 41.

The above is the construction of another example of this invention. With such a construction, when the magnetic tape recorder mechanism A, the record player mechanism B and the electric circuit C are in the temporary stop, non-reproducing and recording modes of operation, respectively, if the temporary stop mode releasing input 22 is applied to the drive control mechanism 11 of the magnetic tape recorder A, the magnetic tape recorder mechanism A is switched into the constant-speed forwarding mode and the information 70 indicative of the above switching of the mode of operation is obtained from the means 71. Since the information 70 is applied to the record player mechanism B as an input equal to the reproducing mode input 41, the record player mechanism B is switched from the non-reproducing mode to the reproducing mode of operation, with the result that the acoustic signal played back by the transducer 38 of the record player B is supplied through the electric circuit C to the magnetic head 10 of the magnetic tape recorder mechanism A and recorded on the magnetic tape 5.

With such a second embodiment of this invention described above, only by applying the temporary stop mode releasing input 22 to the magnetic tape recorder A when the magnetic tape recorder mechanism A, the record player mechanism B and the electric circuit C are in the temporary stop, non-reproducing and recording modes of operation, respectively, the record player mechanism B is automatically altered into the reproducing mode and the reproduced acoustic signal from the record player mechanism B is automatically recorded on the side of the magnetic tape recorder mechanism A.

Accordingly, the operation for recording the reproduced acoustic signal from the record player mechanism B on the side of the magnetic tape recorder mechanism A is extremely simplified. Further, since the record player mechanism B is put in the reproducing mode upon application of the temporary stop mode releasing input 22 on the side of the magnetic tape recorder mechanism A or a predetermined period of time thereafter, it is possible to effectively avoid the inconveniences that one part of the reproduced acoustic signal from the record player mechanism B is not recorded on the magnetic tape 5 or that recording of the acoustic signal on the magnetic tape 5 does not start from a predetermined position thereon.

Although the FIG. 2 embodiment of this invention has been described with regard to the case where the magnetic tape recorder mechanism A has provided therein the means 71 for obtaining the information 70 indicative of the magnetic tape recorder mechanism A having been switched from the temporary stop mode to the constant-speed forwarding mode of operation, it is also possible to obtain exactly the same results as those described above by providing means in the magnetic tape recorder mechanism A for obtaining detecting information indicative of switching of the magnetic tape recorder mechanism A to the constant-speed mode from the stop mode of operation, though not illustrated. In practice, the latter means can be constructed to be associated with the drive control mechanism 11 to electrically or mechanically detect the constant-speed forwarding mode input 13 thereto. It will be evident that, in such a case, exactly the same results as those in the case described previously can be obtained by applying the constant-speed forwarding mode input 13 to the drive control mechanism 11 of the magnetic tape recorder mechanism A when the magnetic tape recorder mechanism A, the record player mechanism B and the electric circuit C are in the stop, non-reproducing and recording modes of operation, respectively.

Further, the embodiment of this invention shown in FIG. 2 has been described to have the construction that the record player mechanism B is put in the reproducing mode of operation as a whole only by the application of the reproducing mode input 41 to the drive control mechanism 40 of the record player mechanism B and that the record player mechanism B is changed over from the above mode to the non-reproducing mode of operation as a whole only by the application of the non-reproducing mode input 45 to the drive control mechanism 40. However, this invention is also applicable even if the record player mechanism B has such a construction that the turntable 32 is driven by the application of a first input and that the tone arm 36 is then driven by the application of a second input to perform the series of operations—rising from the rest 39, rotation toward the record 31 and lowering toward the sound groove of the record 31—to obtain the reproducing mode as a whole. In such a case, it is sufficient only that the information 70 obtained from the side of the magnetic tape recorder mechanism A is applied as the abovesaid second input to the side of the record player mechanism B. In this case, exactly the same results as the aforesaid ones can be obtained by switching the magnetic tape recorder mechanism A to the constant-speed forwarding mode of operation when the magnetic tape recorder mechanism A is in the stop mode defined by the aforementioned temporary stop or stop mode of operation and the record player mechanism B is in the non-reproducing mode in which it is only supplied with the aforementioned first input and the electric circuit C is in the recording mode, respectively.

Moreover, this invention is also applicable in the case where the record player mechanism B has such a construction that the turntable 32 is driven by the application of a first input, that the tone arm 36 is driven by the application of a second input to rise from the rest 39 and rotate to bring the stylus 37 to the predetermined position above the record 31 and that, by the application of a third input following such first and second inputs, the tone arm 36 is driven to bring the stylus 37 into engagement with the sound groove from the abovesaid predetermined position above the record 31, thereby to obtain the reproducing mode as a whole. In this case, it is sufficient only that the information 70 obtained on the side of the magnetic tape recorder mechanism A is applied as the abovesaid third input to the record player mechanism B. In such a case, it is sufficient only to change over the magnetic tape recorder mechanism A to the constant-speed forwarding mode in such a state that the magnetic tape recorder mechanism A is in the temporary stop or the stop mode of operation and that the record player mechanism B is in the non-reproducing mode in which it is supplied with the aforementioned first and second inputs. It will be seen that various other modifications and variations may be effected in accordance with the type of the record player mechanism B used.

Figure 3:
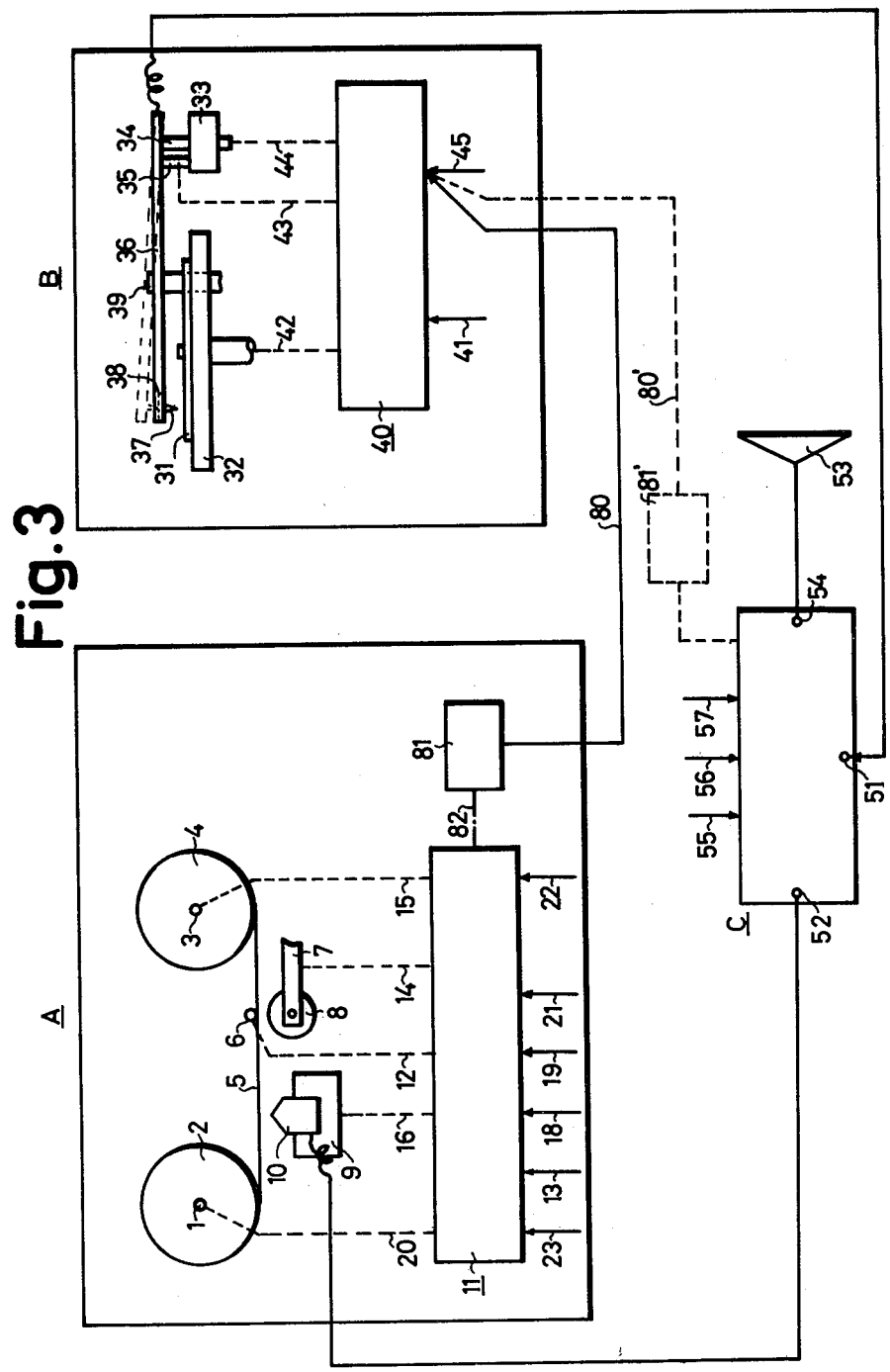

FIG. 3 illustrates a further embodiment of this invention, in which parts corresponding to those in FIG. 1 are marked with the same reference numerals and characters and no detailed description will be repeated with regard to them. The present embodiment also does not employ the means 61 and the mechanisms 62 to 65 described previously in connection with FIG. 1. However, this embodiment employs means 81 on the side of the magnetic tape recorder mechanism A for obtaining information 80 indicative of switching of the magnetic tape recorder mechanism A from the constant-speed forwarding mode to one of the other modes of operation. In practice, the means 81 can be constructed to be associated with the drive control mechanism 11, as indicated by reference numeral 82, to electrically or mechanically detect the application of one of such inputs 23, 18, 19 and 20 to the drive control mechanism 11 of the magnetic tape recorder mechanism A for the stop, fast forwarding, rewinding and temporary stop modes of operation except the constant-speed forwarding mode input 13.

The information 80 obtained from the means 81 is supplied to the drive control mechanism 40 of the record player mechanism B as an input equal to the non-reproducing mode input 45.

The above is the construction of the FIG. 3 embodiment of this invention. With such a construction, by applying to the drive control mechanism 11 of the magnetic tape recorder mechanism A the input for one of the modes of operation except the input 13 for the constant-speed forwarding mode when the magnetic tape recorder mechanism A, the record player mechanism B and the electric circuit C are in the constant-speed, reproducing and recording modes of operation, respectively, and when the reproduced acoustic signal from the transducer 38 of the record player mechanism B is being supplied through the electric circuit C to the magnetic head 10 of the magnetic tape recorder mechanism A and recorded on the magnetic tape 5, the magnetic tape recorder mechanism A is altered into the mode of operation corresponding to the input applied to the drive control mechanism 11. And the information 80 is obtained from the detecting means 81 and applied to the side of the record player mechanism B as an input equal to the non-reproducing mode input 45, by which the record player mechanism B is switched from the reproducing mode to the non-reproducing mode of operation.

In accordance with the construction of the embodiment of FIG. 3, when the magnetic tape recorder mechanism A, the record player mechanism B and the electric circuit C are in the constant-speed forwarding, reproducing and recording modes of operation, respectively, and when the acoustic signal derived from the side of the record player mechanism B is being recorded on the side of the magnetic tape recorder mechanism A, the record player mechanism B is automatically switched to the non-reproducing mode of operation only by applying to the magnetic tape recorder mechanism A one input other than the constant-speed forwarding mode input 13.

Accordingly, the present embodiment has such a great advantage that it remarkedly simplifies the operation for releasing the state in which the reproduced acoustic signal from the side of the record player mechanism B is recorded on the side of the magnetic tape recorder mechanism A.

The FIG. 3 embodiment has been described in connection with the case where the means 81 is provided on the side of the magnetic tape recorder mechanism A. However, it is also possible to provide detecting means 81' in association with the electric circuit C as indicated by the broken line. The detecting means 81' detects that the electric circuit C in the recording mode is switched by the application thereto of the reproducing mode input 55 for the magnetic tape recorder mechanism A to the state of supplying no information from the side of the electric circuit C to the magnetic head 10 of the magnetic tape recorder mechanism A. Such information 80' is applied to the side of the record player mechanism B in the same manner as described above, by which the same results as described above can be obtained.

The FIG. 3 embodiment of this invention has been described to have such a construction that, only by the application of the non-reproducing mode input 45 to the drive control mechanism 40 of the record player mechanism B when the record player mechanism B is in the reproducing mode of operation, the apparatus is automatically put in the non-reproducing mode of operation as a whole. However, so long as the record player mechanism B has such a construction that at least the tone arm 36 is actuated by the application of an input to raise the stylus 37 to disengage it from the sound groove of the record 31, the same results as described above can be obtained by applying the information obtained from the magnetic tape recorder mechanism A or the electric circuit C to the record player mechanism B as an input equal to the abovesaid input used in this case.

Figure 4:
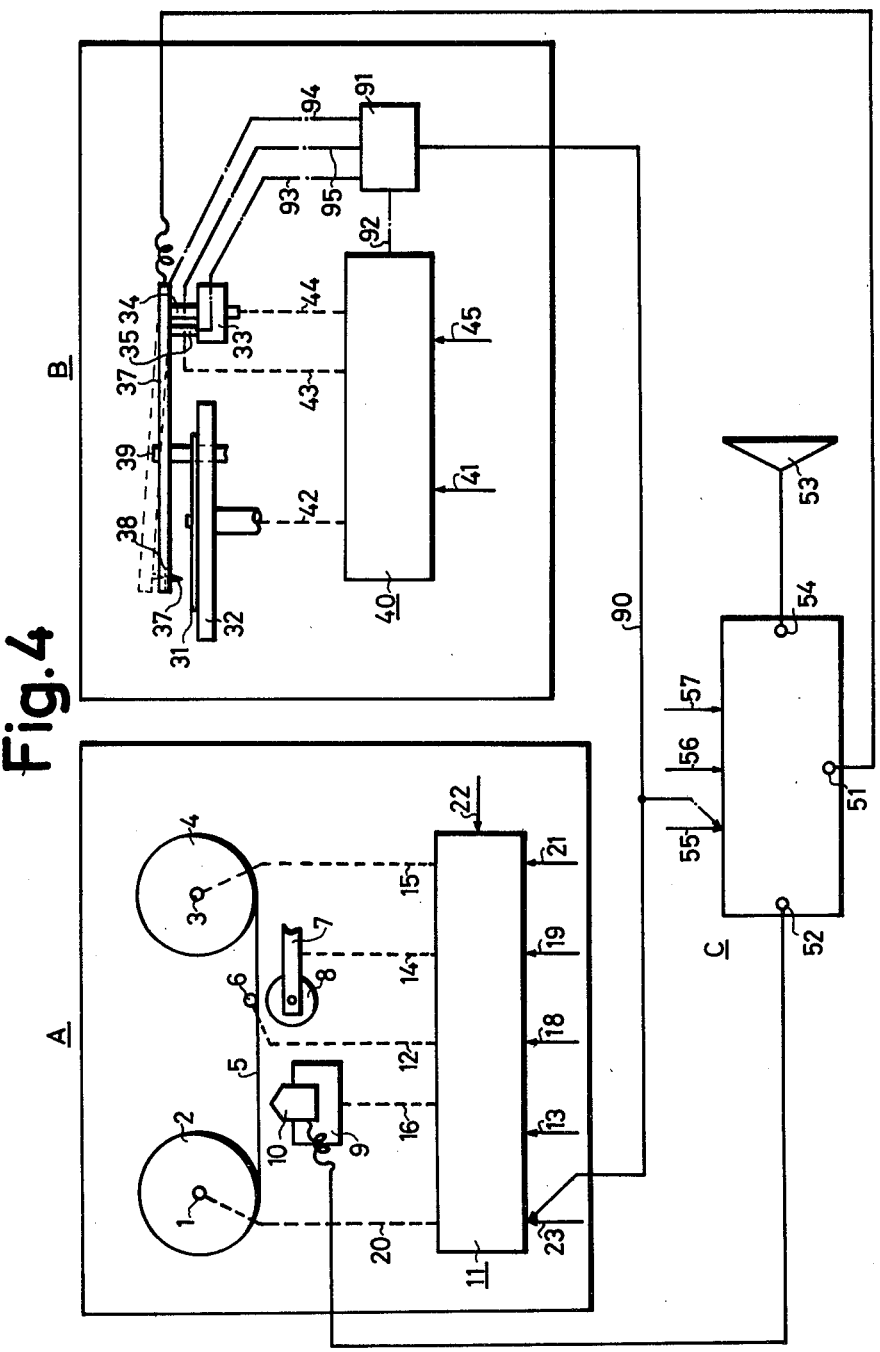

FIG. 4 illustrates still further embodiment of this invention, in which parts corresponding to those in FIG. 1 are identified by the same reference numerals and characters and no detailed description will be repeated in connection with them. In this example, there are omitted the means 61 and its associated mechanisms 62 to 65 in the construction described previously with regard to FIG. 1, as is the case with FIGS. 2 and 3. In the present embodiment, however, there is provided means 91 on the side of the record player mechanism B for obtaining information 90 indicating changeover of the record player mechanism B from the reproducing mode to the non-reproducing mode of operation. In practice, the means 91 can be constructed as desired. For example, when the means 91 is associated with the control drive mechanism 40 as indicated by reference numeral 92, it electrically or mechanically detects the non-reproducing mode input 45 to the drive control mechanism 40; when associated with the arm lift member 35 as indicated by 93, it electrically or mechanically detects the first rising or lowering movement of the arm lift member 35 after switching of the record player mechanism B to the reproducing mode; when associated with the tone arm 36 as indicated by 94, it electrically or mechanically detects the first rising or lowering movement of the tone arm 36 after switching of the record player mechanism B to the reproducing mode or the rotational movement of the tone arm 36 to bring the stylus 37 toward or to the position right above the position of termination of the sound groove of the record 31; and, further, when associated with the rotary shaft 34 as indicated by 95, it electrically or mechanically detects the rotational movement of the rotary shaft 34 to bring the stylus 37 toward or to the position of termination of the sound groove of the record 31.

The information 90 obtained from the detecting means 91 is applied to the drive control mechanism 11 of the magnetic tape recorder mechanism A as an input equal to the stop mode input 23.

The above is the construction of the embodiment of this invention shown in FIG. 4. With such a construction, for example, if the non-reproducing mode input 45 is applied to the drive control mechanism 40 of the record player mechanism B when the magnetic tape recorder mechanism A, the record player mechanism B and the electric circuit C are in the constant-speed forwarding, reproducing and recording modes of operation, respectively, and consequently the reproduced acoustic signal from the transducer 38 of the record player mechanism B is being supplied through the electric circuit C to the magnetic head 10 of the magnetic tape recorder mechanism A and recorded on the magnetic tape 5, the record player mechanism B is changed over to the non-reproducing mode. And the information 90 is obtained from the detecting means 91 and applied to the side of the magnetic tape recorder mechanism A as an input equal to the stop mode input 23, by which the magnetic tape recorder mechanism A is switched from the constant-speed forwarding mode to the stop mode. As a result of this, the magnetic tape recorder mechanism A is released from the state of recording the reproduced acoustic signal supplied from the side of the record player mechanism B.

In accordance with such embodiment of this invention shown in FIG. 4, only by applying the non-reproducing mode input 45 to the record player mechanism B when the magnetic tape recorder mechanism A, the record player mechanism B and the electric circuit C are in the constant-speed forwarding, reproducing and recording modes of operation, respectively, and consequently the acoustic signal supplied from the side of the record player mechanism B is being recorded on the side of the magnetic tape recorder mechanism A, the magnetic tape recorder mechanism A is automatically changed over to the stop mode, thereby automatically removing the state that the reproduced acoustic signal from the record player mechanism B is recorded on the side of the magnetic tape recorder mechanism A.

Accordingly, the operation for removing the state that the reproduced acoustic signal obtained from the record player mechanism B is recorded on the side of the magnetic tape recorder mechanism A is made fairly simple. At the same time, since it is possible to obtain the information that the magnetic tape recorder mechanism A becomes of the stop mode of operation upon application of the non-reproducing mode input 45 to the side of the record player mechanism B or at an instant a predetermined period of time after it, there is no possibility of unnecessary or accidental erasure of the information recorded on the magnetic tape or the formation of an unnecessarily long non-recorded area on the magnetic tape which requires rewinding of the magnetic tape in case of the subsequent recording.

The embodiment of this invention illustrated in FIG. 4 has been described with regard to the case where the detecting information 90 obtained from the detecting means 91 provided on the side of the record player mechanism B is applied to the drive control mechanism 11 of the magnetic tape recorder mechanism A as an input similar to the stop mode input 23. However, it is also possible to apply the abovesaid information to the electric circuit C as an input similar to the reproducing mode input 55 for the magnetic tape recorder mechanism A, as shown by the chain line in FIG. 4. In this case, when the magnetic tape recorder mechanism A, the record player mechanism B and the electric circuit C are in the constant-speed forwarding, reproducing and recording modes of operation, respectively, the electric circuit C is altered into the reproducing mode for the record player mechanism B. Consequently, no information from the electric circuit C is applied to the magnetic head 10 of the magnetic tape recorder mechanism A but the acoustic signal is played back by the magnetic head 10 from the magnetic tape 5 and is then supplied through the electric circuit C to the speaker 53. Further, the information 90 from the detecting means 91 may also be applied to the electric circuit C as an input similar to the reproducing mode input 56 for the record player mechanism B, though not illustrated. In this case, when the magnetic tape recorder mechanism A, the record player mechanism B and the electric circuit C are in the constant-speed forwarding, reproducing and recording modes of operation, respectively, the electric circuit C is changed over to the reproducing mode for the record player mechanism A. Consequently, no information from the electric circuit C is supplied to the magnetic head 10 of the magnetic tape recorder mechanism A but the information from the record player mechanism B is supplied to the speaker 53 through the electric circuit C. Moreover, the information 90 from the detecting means 91 may also be applied to the drive control mechanism 11 of the magnetic tape recorder mechanism A as an input similar to one of the fast forwarding, rewinding, temporary stop and other mode inputs 18, 19, 21, etc. except the constant-speed forwarding mode input 13. In such a case, when the magnetic tape recorder mechanism A, the record player mechanism B and the electric circuit C are in the constant-speed forwarding, reproducing and recording modes of operation, respectively, the magnetic tape recorder mechanism A is switched to one of the fast forwarding, rewinding, temporary stop and other modes except the constant-speed forwarding mode. It will be evident that any of the above modifications provides the same results as those in the case of applying the information 90 from the detecting means 91 to the drive control mechanism 11 of the magnetic tape recorder mechanism A as an input similar to the stop mode input.

Further, the FIG. 4 embodiments have been described to have such a construction which is capable of obtaining the non-reproducing mode as a whole only by applying the input 45 for the non-reproducing mode to the drive control mechanism 40 when the record player mechanism B is in the reproducing mode. However, the record player mechanism B may also be of, for example, such a construction that, only by achieving the series of operations of the tone arm 36—rising up from the sound groove of the record 31, rotation to the rest 39 and lowering onto the rest 39—by hand, instead of using the non-reproducing mode input 45 when the record player mechanism B is in the reproducing mode of operation, the record player mechanism B is changed over to the non-reproducing mode in which the turntable 32 continues rotating but the information recorded on the record 31 is not played back by the transducer 38. The record player mechanism B may be any of other constructions, so long as it is switched from the reproducing mode to the non-reproducing mode.

The embodiments of this invention shown in FIGS. 1 to 4 have been described above in connection with the case where the magnetic tape recorder mechanism is an acoustic magnetic tape recorder mechanism adapted to handle an acoustic signal by the employment of a magnetic tape and a magnetic head and the disc recorder mechanism is an acoustic record player mechanism designed to similarly handle an acoustic signal by the use of a record having a sound groove cut therein and a tone arm having a transducer associated with a stylus. However, it will be understood that the magnetic tape recorder mechanism may also be any of such tape recorder mechanisms which handle not only an acoustic signal but also a video signal by the employment of various tape-like record media and transducers and that the disc recorder mechanism may also be any of such record players which handle not only an acoustic signal but also a video signal by the use of various disc-shaped record media and transducers. Further, it is also possible to combine the constructions of the embodiments shown in FIGS. 1 to 4.

FIGS. 5–10 illustrate in detail a conventional record player-tape recorder combination.

Figure 5:
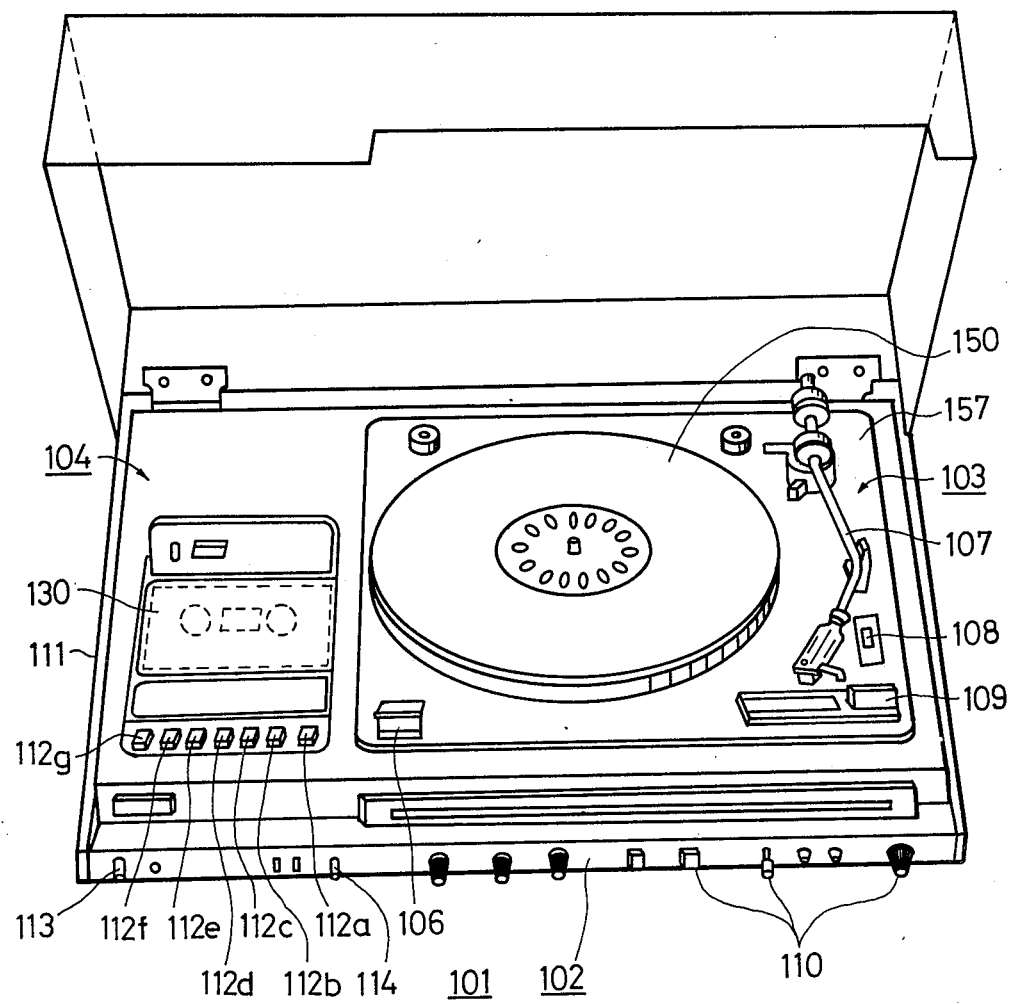
FIG. 5 is a perspective view illustrating a combined phonograph record player and recorder in accordance with an embodiment of this invention.

Referring initially to FIG. 5, it will be seen that an apparatus 101 according to this invention generally comprises a housing or casing 102 in which there are suitably mounted a first device 103 in the form of a phonograph record player and a second device 104 shown in the form of a cassette type tape recorder which may be made operative to reproduce signals recorded on the magnetic tape contained in a cassette 130 and/or to record signals on such tape, for example, to record the content of a phonograph record being simultaneously played by the phonograph record player 103. If desired, the portion of housing 102 in front of phonograph record player 103 may further contain a radio receiver which is suitably controlled by various knobs 110 extending from the front wall of housing 102.

Figure 7:
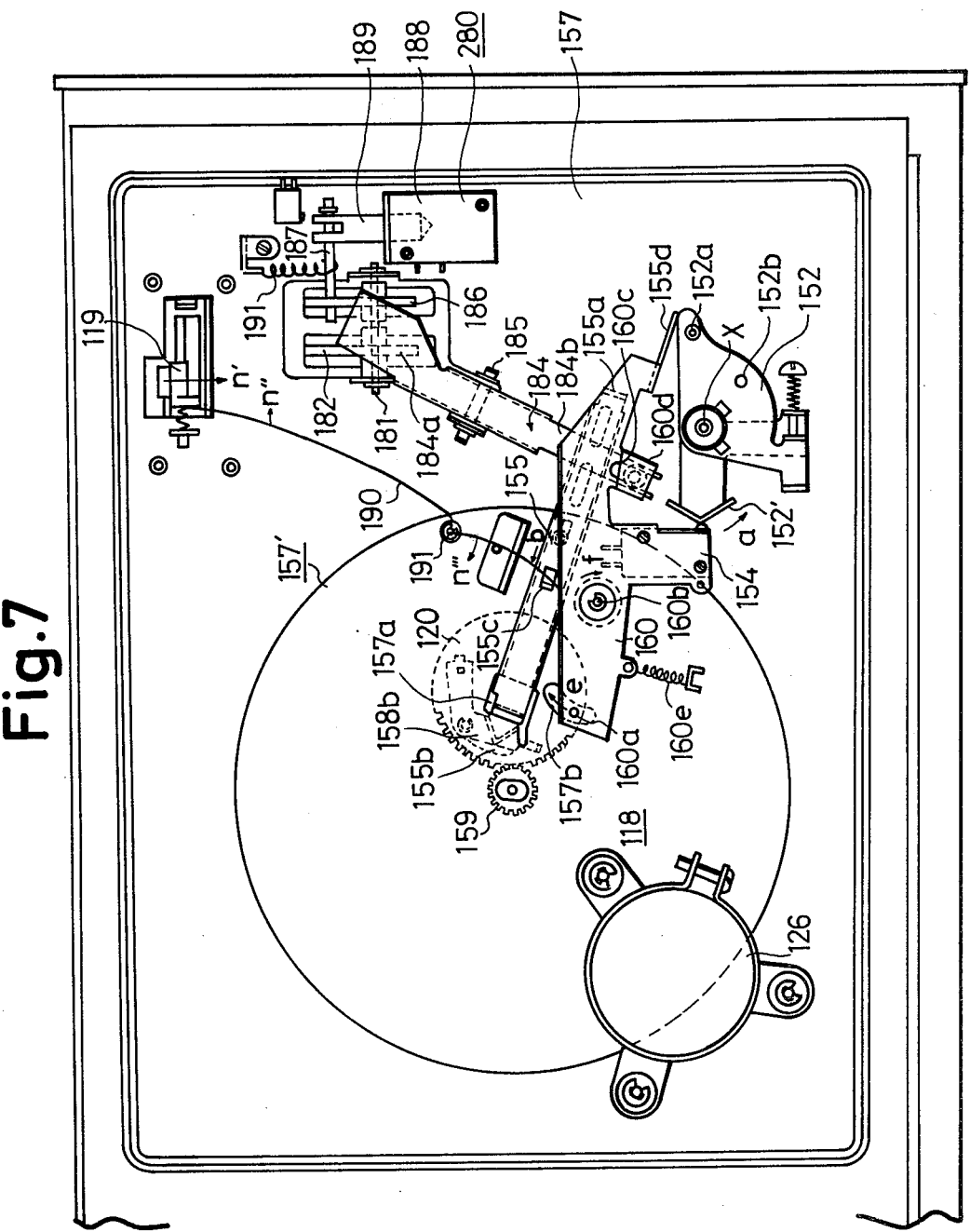
FIG. 7 is an enlarged bottom plan view of the phonograph record player.
Figure 8:
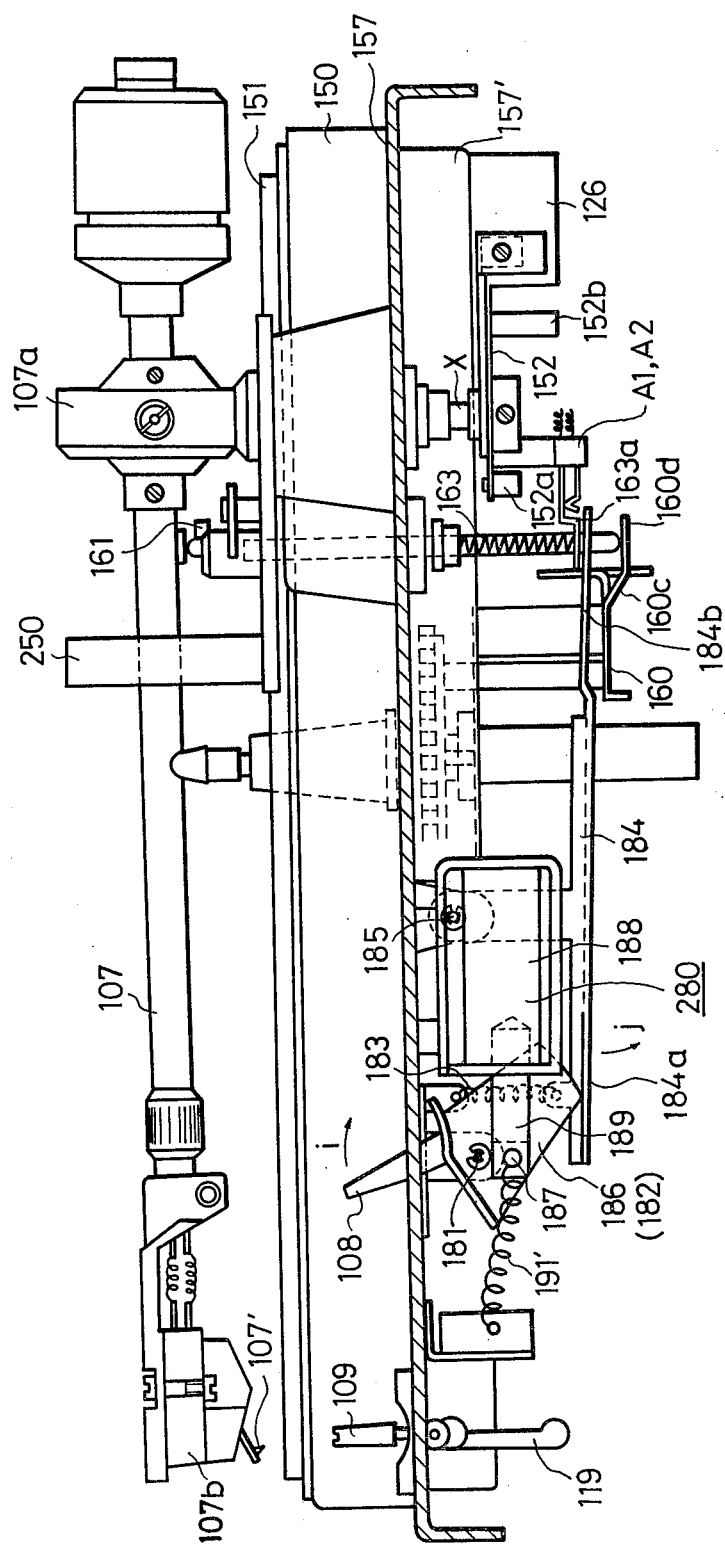
FIG. 8 is an enlarged sectional view taken along the line VIII—VIII on FIG. 6, and showing details of the arrangements provided for lifting the tone arm of the phonograph record player.

The phonograph record player 103 is shown to include a base plate 157 having a circular depression 157' therein (FIG. 7) over which a turntable 150 is rotatably mounted for supporting a phonograph record 151 (FIG. 8). The phonograph record player 103 is further shown on FIG. 5 to generally include a turntable speed selector control lever 106, a tone arm 107, a cueing control lever 108 for manually lifting and lowering tone arm 107, and a control lever 109 for rejecting or aborting a record playing operation of the phonograph record player.

As further shown on FIG. 5, the tape recorder 104 has a recess 111 in its deck for receiving the tape cassette 130, and a series of push-buttons 112a–112g associated with conventional mechanisms for selecting various operating modes or states of tape recorder 104. Thus, push-button 112a may be depressed to select the pause state in which driving of the tape in recorder 104 is temporarily halted, push-button 112b may be depressed to select the recording operating mode, push-button 112c may be depressed to select the fast-forward operating mode in which the tape is rapidly transferred from the supply reel to the take-up reel within cassette 130, push-button 112d may be depressed to select the normal-forward operating mode in which the tape is relatively slowly transferred from the supply reel to the take-up reel during a reproducing operation or during a recording operation if push-button 112b is simultaneously depressed with push-button 112d, push-button 112e may be depressed to select the full-stop state of recorder 104 in which the driving of the tape is halted and can be again initiated only by depressing push-button 112c or push-button 112d, push-button 112f may be depressed to select the rewind operating mode in which the tape is rapidly transferred from the take-up reel back to the supply reel, and push-button 112g may be depressed for ejecting the cassette 130 from recess 111. Further, the apparatus 101, as shown, may be provided with a control 113 for a power switch by which the various circuits of the apparatus are connected with a source of power, and with a control 114 which, in one state, permits the independent operation of phonograph record player 103 and tape recorder 104 and, in another state, interlocks or establishes inter-dependency between the operations of phonograph record player 103 and tape recorder 104, as hereinafter described in detail.

Figure 6:
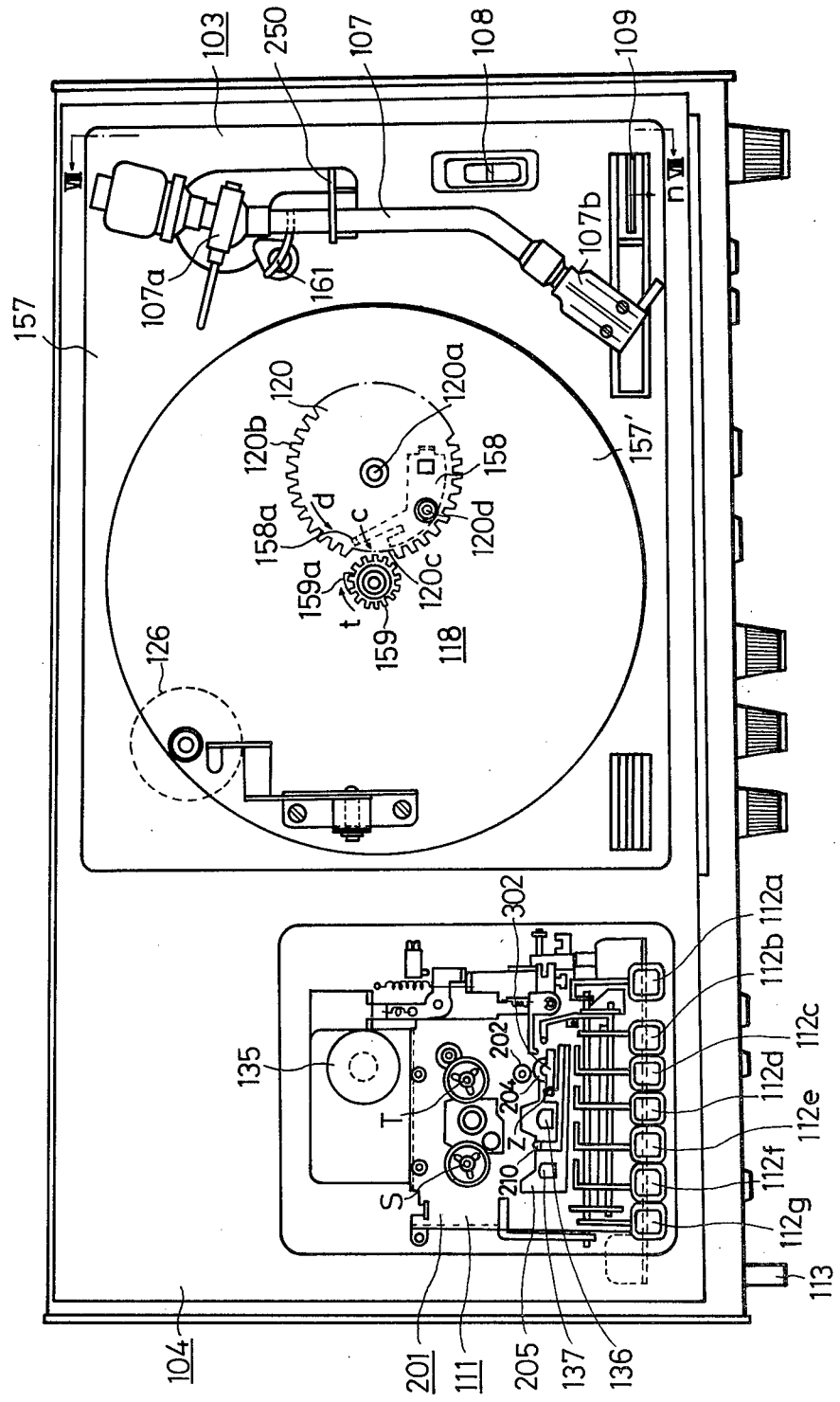
FIG. 6 is a schematic plan view of the apparatus shown in FIG. 1, but with the turntable of the phonograph record player and the cover plate or top deck of the tape recorder being removed.

Referring now to FIGS. 6, 7 and 8, it will be seen that tone arm 107 is conventionally mounted adjacent one end, as by a gimbal 107a, on a vertical rotatable shaft X supported in bearings carried by base plate or frame 157 so that the tone arm 107 carrying a conventional pickup 107b with a stylus 107' at its free end is capable of lateral swinging movement across turntable 150 and also capable of being raised and lowered relative to the turntable.

Thus, tone arm 107 is capable of movement between an elevated rest position on an arm rest 250 outside the perimeter of turntable 150 (FIGS. 6 and 8) and an inner position (not shown) which corresponds to the engagement of pickup stylus 107' in the conventional final non-recorded groove portion of the record 151 on turntable 150. A rotary plate assembly 152 is mounted on shaft X below base plate 157 (FIGS. 7 and 8) so as to turn with tone arm 107 about the axis of shaft X and includes a switch actuator 152' (FIG. 7) which, in the rest position of tone arm 107 is engageable with a switch 154 so as to open the contacts of the latter. The switch 154 is interposed in a suitable circuit (not shown) through which a motor 126 is energizable to drive turntable 150 by way of a suitable transmission (not shown) only when switch actuator 152' is disengaged from switch 154.

In order to initiate the operation of phonograph record player 103 for playing a record 151 disposed on turntable 150, tone arm 107 is manually removed from its rest position on arm rest 250 and is turned with shaft X about the axis of the latter and lowered so as to engage pickup stylus 107' in a selected portion of the record groove on phonograph record 151, for example, in the outermost turn of the spiral record groove. Such movement of tone arm 107 disengages switch actuator 152' from switch 154 to cause energizing of motor 126 and rotation of turntable 150. Thereafter, the playing of the phonograph record is continued with the tone arm 107 swinging progressively inward across the record 151 by reason of the tracking of stylus 107' in the spiral record groove.

The illustrated phonograph record player 103 is provided with an automatic stop mechanism 118 (FIGS. 6 and 7) which is effective to stop the playing of the phonograph record 151 and to return tone arm 107 to its rest position either when the playing of the phonograph record has been completed, that is, when tone arm 107 reaches the inner position corresponding to the engagement of stylus 107' in the final non-recorded groove portion of the record, or when reject control lever 109 is manually actuated.

The automatic stop mechanism 118 is shown to include a pin 152a depending from rotary plate assembly 152 and being engageable, when plate assembly 152 turns in the direction of the arrow a on FIG. 7 to a position (not shown) corresponding to the previously mentioned inner position of tone arm 107, against an end portion 155a of a longitudinally movable slide 155 which is slidably mounted under base plate 157 and is movable in the direction of the arrow b on FIG. 7 when actuated by pin 152a. The opposite end portion of slide 155 is bent upwardly so as to extend through an aperture 157a in the depression 157' of the base plate and extends adjacent the axis of rotation of turntable 150. The end portion of slide 155 which extends through aperture 157a has a pointed end 155b (FIG. 7) which is located under a control gear 120 rotatably mounted within depression 157' on a shaft 120a. The control gear 120 is shown to have peripheral teeth 120b with a gap or recess 120c which in the initial position of control gear 120 (FIG. 6), faces toward a pinion 159 fixed on the shaft of turntable 150 for rotation with the latter. It will be apparent that, in the initial position of control gear 120, pinion 159 can rotate with the turntable independently of control gear 120. In order to initiate rotation of control gear 120, a clutch member 158 is pivotally mounted under gear 120 on a pin 120d carred by the latter. The clutch member 158 includes an end portion 158a located adjacent gap 120c and which, in the illustrated inoperative position of clutch member 158 is outside the orbit of a claw member 159a which rotates with pinion 159 in the direction of the arrow t on FIG. 6. Clutch member 158 further has a downwardly directed projection 158b (FIG. 7) engageable by the pointed end 155b of slide 155 so that, when slide 155 is displaced in the direction of the arrow b, clutch member 158 is turned in the direction of the arrow c on FIG. 6 to an operative position in which its end portion 158a is engageable by the rotated claw member 159a to initiate the rotation of control gear 120 in the direction of the arrow d. Such initial rotation of gear 120 brings its peripheral teeth 120b into meshing engagement with the teeth of rotated pinion 159, whereupon the rotation of gear 120 is continued through a complete revolution, that is, until gap 120c again returns to the position adjacent pinion 159.

The underside of control gear 120 has a cam groove (not shown) formed therein and being slidably engaged by a cam follower pin 160a (FIG. 7) which extends upwardly through a slot 157b in base plate 157 from one end of a control lever 160 which is pivoted, intermediate its ends, on a pin 160b depending from base plate 157. During the first half-revolution of control gear 120, cam follower pin 160a is moved in the direction of the arrow e on FIG. 7 so as to turn control lever 160 in the direction of the arrow f and, thereafter, during the second or final half-revolution of control gear 120 control lever 160 is turned in the opposite direction, that is, in the counter-clockwise direction as viewed on FIG. 7, so as to restore control lever 160 to its original position shown on FIG. 7 under the urging of a spring 160e.

As shown on FIGS. 7 and 8, the arm portion of control lever 160 opposite to the arm portion carrying cam follower pin 160a has a rearwardly directed extension 160d which is at a lower level than the remainder of lever 160 and is connected to the latter by an inclined ramp portion 160c. With control lever 160 in its initial or starting position (FIG. 7) its relatively low extension 160d extends under, and supports the lower end of a vertically movable lift rod 163 (FIG. 8) which extends slidably through a suitable bearing carried by base plate 157 and which is urged downwardly by a compression spring 164. An arcuate arm lifter 161 (FIG. 6 and 8) extends under tone arm 107 in all positions of the latter and is mounted on the upper end of vertically movable lift rod 163 so as to move with the latter. When control lever 160 is in its original or starting position (FIG. 7) so that its relatively low extension 160d is disposed under rod 163, rod 163 and lifter 161 are in relatively low positions so that tone arm 107 can be lowered to engage pickup stylus 107' with the phonograph record 151. However, in response to the initial turning of control lever 160 from its starting position in the direction of the arrow f on FIG. 7, inclined ramp 160c of control lever 160 moves under rod 163 so as to displace the latter upwardly and thereby raise arm lifter 161 against tone arm 107. Accordingly, arm lifter 161 raises tone arm 107 and pickup stylus 107' is lifted from the surface of phonograph record 151.

As control lever 160 is further turned in the direction of the arrow f on FIG. 7, an extension 155d on lever 160 engages with a pin 152b depending from rotary plate assembly 152 with the result that, during the final turning of lever 160 in the direction of the arrow f, rotary plate assembly 152, and hence shaft X and tone arm 107 are turned in the direction opposed to the arrow a on FIG. 7 for returning tone arm 107 to its rest position above arm reset 250. As shown on FIG. 8, two normally closed switches A1 and A2 are mounted under base plate 157 adjacent lift rod 163, and the latter has a flange 163a fixed thereon to actuate switches A1 and A2 and thereby open the contacts of the latter when lift rod 163 is raised by its engagement with the ramp 160c and the adjacent relatively high portion of control lever 160. Thus, normally closed switches A1 and A2 are open in response to the lifting of the pickup stylus 107' from the surface of phonograph record 151. As shown on FIG. 8, a normally closed switches A1 and A2 are mounted under base plate 157 adjacent lift rod 163, and the latter has a flange 163a fixed thereon to actuate switch A and thereby open the contacts of the latter when lift rod 163 is raised by its engagement with the ramp 160c and the adjacent relatively high portion of control lever 160. Thus, normally closed switches A1 and A2 are open in response to the lifting of the pickup stylus 107' from the surface of phonograph record 151.

With tone arm 107 returned to a position above arm rest 250, rotary plate assembly 152 is restored to the position shown on FIG. 7 and, as previously mentioned, control lever 160 is turned counter to the arrow f and restored to its original illustrated position during the final or second half-revolution of control gear 120 so that, upon the completion of the full revolution of gear 120, switch 154 is again engaged by switch actuator 152' to cause deenergizing of motor 126. Further, upon the restoration of control lever 160 to its original illustrated position, the relatively low extension 160d of control lever 160 is again positioned under lift rod 163 so that spring 164 moves lift rod 163 and arm lifter 161 in the downward direction to permit the settling of tone arm 107 on arm rest 250. Accordingly, the automatic shut-off of phonograph record player 103 with its tone arm 107 returned to its rest position is completed.

In order to provide for the operation of the above described automatic shut-off mechanism 118 in response to actuation of the rejecting control lever 109 as well as in response to completion of the playing of a record, the phonograph record player 103 is further shown to have an arm 119 (FIGS. 7 and 8) pivotally mounted below base plate 157 and being connected with control lever 109 so as to move in the direction of the arrow n' of FIG. 7 in response to manual actuation of the related control lever 109. An elongated spring lever 190 (FIG. 7) is pivotally mounted intermediate its ends under base plate 157, as on a pivot pin 191, and has one of its ends suitably connected with arm 119, while its other end acts against a tab 155c which is struck from slide 155. When control lever 109 is actuated to move arm 119 in the direction of the arrow n', the opposite end portions of spring 190 are moved in the direction of the arrows n'' and n''', respectively, on FIG. 7, with the result that spring 190 displaces slide 155 in the direction of the arrow b for again initiating the operation of automatic shut-off mechanism 118. Thus, upon manual actuation of control lever 109 for rejecting or aborting the operation of phonograph record player 103 prior to the completion of the playing of a record 151, tone arm 107 is immediately raised for lifting pickup stylus 107' from the surface of the record, switches A1 and A2 are actuated to their open condition and tone arm 107 is restored to its rest position with motor 126 then being rendered inoperative.

In order to provide for the manual lifting and lowering of tone arm 107 by the action of cuing control lever 108, the latter is shown to extend upwardly through a suitable slot in base plate 157 from a respective cam or eccentric 182 which is pivoted on a pin 181 mounted below base plate 157 (FIGS. 7 and 8). A lever 184 is rockable, intermediate its ends, on a pivot 185 mounted below base plate 157, and the forward end portion 184a extends under cam or eccentric 182 and is urged upwardly into engagement with cam 182 by means of a spring 183. The back end portion 184b for rockable lever 184 is bifurcated and embraces the lower end portion of lift rod 163 under flange 163a. Thus, when cuing control lever 108 is displaced in the direction of the arrow i on FIG. 8, the turning of the respective cam or eccentric 182 rocks lever 184 in the direction of the arrow j with the result that its back end portion 184b is raised to lift rod 163 and arm lifter 161, with the result that tone arm 107 is raised for lifting pickup stylus 107' from the surface of phonograph record 151 and switches A1 and A2 are actuated to their open condition. It will be apparent that the actuation of cuing control lever 108 merely raises tone arm 107 for interrupting the playing of the record and does not initiate the operation of previously described shut-off mechanism 118 for returning the tone arm to its rest position. While tone arm 107 is raised by arm lifter 161, the tone arm can be manually turned about the axis of shaft X so as to locate pickup stylus 107' above any desired portion of the record groove of phonograph record 151. When cuing control lever 108 is returned to the position shown on FIG. 8, spring 183 rocks lever 184 in the clockwise direction, as viewed on FIG. 8, with the result that back end portion 184b of lever 184 is lowered to permit the downward movement of rod 163 and arm lifter 161, whereby pickup stylus 107' is again engaged with the grooved surface of record 151. A second cam or eccentric 186 which has a shape similar to that of the cam 182 is pivotally mounted on the pin 181 in side-by-side relation to cam 182 so as to be turnable independently on the latter. The second cam 186 is also engageable with the forward end portion 184a of rockable lever 184, and a pin 187 on cam 186 connects the latter to the armature 189 of a solenoid 280 having a coil 188 within which armature 189 is longitudinally movable. When coil 188 of solenoid 280 is energized, as hereinafter described in detail, core or armature 189 is retracted or drawn into coil 188 to dispose cam 186 in the position shown on FIG. 8 so that spring 183 can dispose rockable lever 184 with its back end portion 184b at its relatively low position. A spring 191' is connected at its opposite ends to pin 187 and to an anchor depending from base plate 157 so that, when coil 188 of solenoid 180 is deenergized, spring 191' is effective to turn cam 186 in the clockwise direction from the position shown on FIG. 8, whereby to rock lever 184 in the direction of the arrow j for raising rod 163 and arm lifter 161 and thereby lifting tone arm 107 and actuating switches A1 and A2 to their open condition, as previously described.

From the foregoing, it will be apparent that switches A1 and A2 actuated from its normal closed condition to its open condition whenever tone arm 107 is raised to removed pickup stylus 107' from engagement with record 151, whether such lifting of tone arm 107 is effected by the operation of automatic shut-off mechanism 118 at the completion of the playing of a record or in response to actuation of reject control lever 109, or by rocking of lever 184 in response to manual actuation of cuing control lever 108 or in response to deenergizing of solenoid 280.

Figure 9:
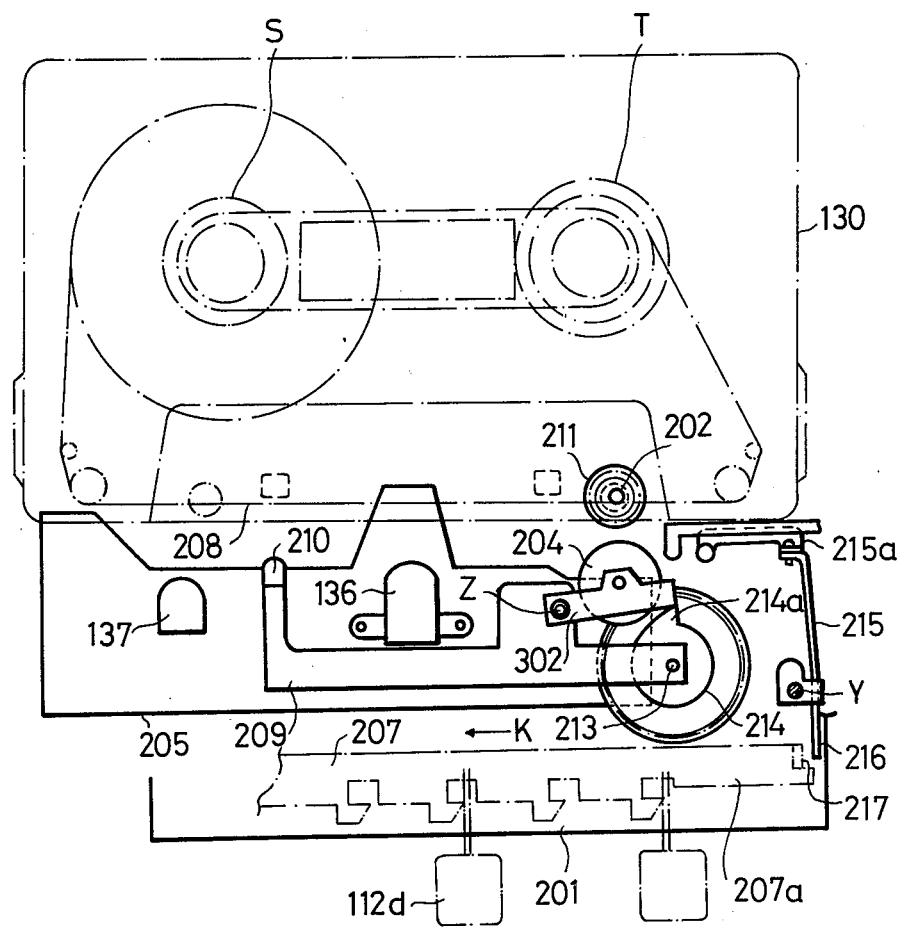
FIG. 9 is an enlarged, schematic plan view showing details of the tape recorder included in the apparatus of FIGS. 5 and 6, with such tape recorder being shown in its shut-off condition or state.
Figure 10:
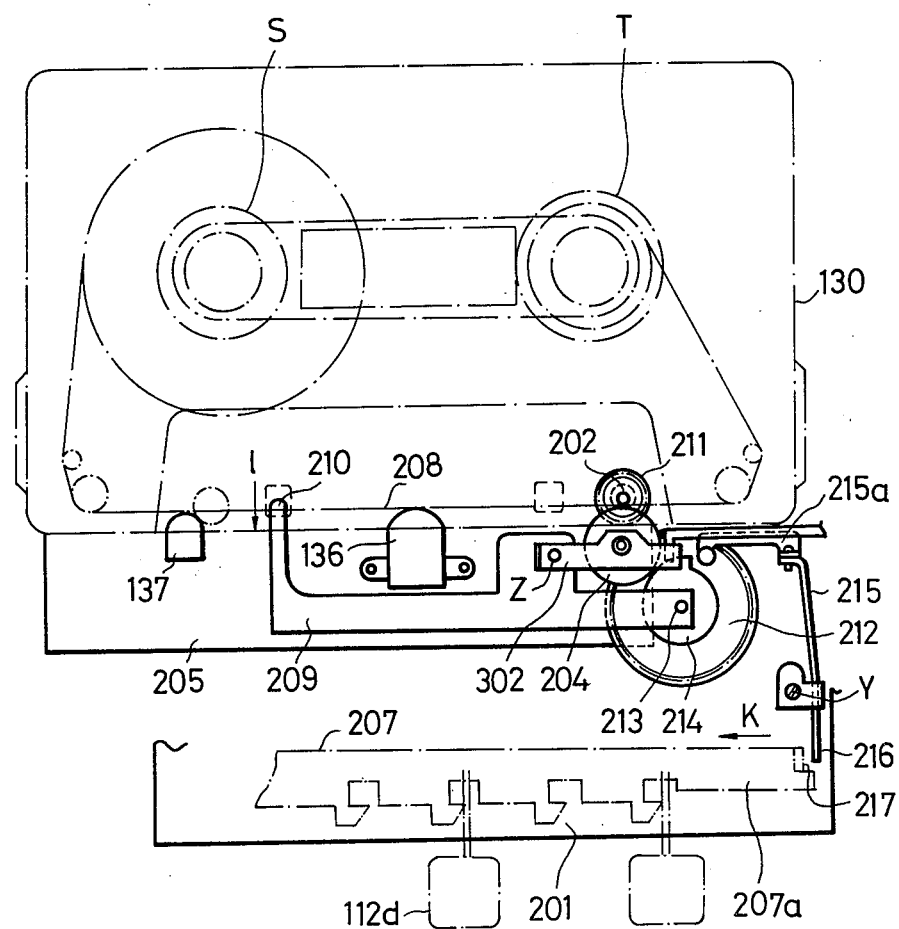
FIG. 10 is a view similar to that of FIG. 9, but showing the tape recorder in its normal tape-driving condition or state, as during the recording on the tape of the content of a phonograph record being played by the associated phonograph record player.

Referring now to FIGS. 6, 9, and 10, it will be seen that the tape recorder 104 included in the apparatus 101 according to this invention is shown to include a chassis 201 having supply and take-up reel drive shafts S and T rotatably mounted thereabove for rotatable coupling with the supply and take-up reels, respectively, of the cassette 130 when the latter is installed in recess 111. A motor 135 on chassis 201 (FIG. 6) is effective, when energized, to drive a capstan 202, as through a belt and pulley transmission (not shown), and the tape recorder 104 is further provided with conventional transmission assemblies by which reel drive shafts S and T are suitably driven in correspondence with the selected operating mode established by depressing either the normal-forward push-button 112d, the fast-forward push-button 112c, or the rewind push-button 112f. Further, as is conventional in tape recorders, the transmission assemblies for rotating reel drive shafts S and T in the normal-forward, fast-forward and rewind operating modes, respectively, are all rendered inoperative in response to actuation of the full-stop push-button 112e, with the previously actuated push-button 112c, 112d or 112f being returned to its inactive position. On the other hand, the actuation of the pause push-button 112a merely temporarily halts the transmission of rotary movement of the reel drive shaft T or S without restoring a previously actuated operating mode selecting push-button to its inactive position.

The illustrated tape recorder 104 is further shown to include the usual carriage 205 which is slidably mounted on chassis 201 so as to be movable between an inactive position (FIG. 9) and an operative position (FIG. 10). Carriage 205 is conventionally moved to its operative position (FIG. 10) in response to the actuation of push-button 112d for selecting the normal-forward operating mode of the tape recorder in which signals are to be recorded on, or reproduced from the tape 208 contained in cassette 130. Carriage 205 carries a recording and/or reproducing magnetic head 136 and an erasing head 137 which, in the operative position of carriage 205 (FIG. 10), project through suitable windows in a side of cassette 130 for engagement with a run of the tape 208 which extends along that side of the cassette past the rotated capstan 202. Carriage 205 further carries an arm 302 pivoted on a pin Z and rotatably supported a pinch roller 204 which, in the operative position of carriage 205 (FIG. 10), is urged against capstan 202 with the tape 208 therebetween, for example, by a suitable spring (not shown) acting on arm 302.

In order to lock any selected one of the push-buttons 112b, 112c, 112d and 112f in its depressed or actuated position, tape recorder 104 is shown to include a conventional locking member 207 (FIGS. 9 and 10) which is yieldably urged toward the right so as to engage a respective one of its locking noses 207' with the push-button which has been depressed until such time as locking member 207 is displaced in the direction of the arrow K so as to release the previously depressed push-button, for example, in response to actuation of the full-stop push-button or any other of the operating mode selecting push-buttons.

The illustrated tape recorder 104 is further shown to be provided with an automatic stop mechanism for halting the driving of the tape 208, that is, for halting the rotation of reel drive shafts S and T, in response to the complete unwinding of the tape from supply reel S in the normal-forward operating mode of the tape recorder. Such automatic stop mechanism is shown to include a lever 209 pivotally mounted intermediate its ends on the pin Z carried by slidable carriage 205 and having an extension 210 at one end which, in the operative position of carriage 205 (FIG. 10), is engageable with the tape 208 within cassette 130 for deflecting the tape from a straight path. The opposite end of lever 209 carries a shaft 213 on which a gear 212 is rotatable and, in the normal position of lever 209 shown on FIG. 10, the periphery of gear 212 is adjacent to, but spaced from a gear 211 which is rotatable with capstan 202. An actuating member 214 which may be in the form of a spiral cam having a radial face 214a is either integral with gear 212 or otherwise rotatable therewith and is adapted, in response to rotation of gear 212, to effect actuation of a shut-off member 215. Such shut-off member 215 is shown to be pivoted, as at Y, on chassis 201 and to have an end portion 216 disposed adjacent an abutment 217 on the respective end portion 207a of locking member 207. The opposite end portion of pivoted shut-off member 215 has a right-angled extension 215a which, when carriage 205 is in its operative position, extends into the path of the radial face or shoulder 214a on the rotary actuating member 214. It will be apparent that, when gear 212 and actuating member 214 are rotated in the clockwise direction from the position shown on FIG. 10, radial shoulder 214a acts on extension 215a to cause clockwise pivoting of shut-off member 215 with the result that end 216 of the latter acts against abutment 217 to displace locking member 207 in the direction of the arrow K and thereby release the previously depressed push-button 112d for removing the tape recorder from its normal-forward operating mode, that is, for halting the rotation of take-up reel drive shaft T and for returning carriage 205 to its inoperative position.

The foregoing operation of the automatic shut-off mechanism occurs when, in the normal-forward operation mode of the tape recorder, all of the tape is unwound from the supply reel and wound onto the take-up reel in cassette 130, with the result that further driving of the tape by capstan 202 is resisted to increase the tension in the tape between the capstan and the supply reel. Such increased tape tension acts on extension 210 of lever 209 to urge the extension 210 in the direction of the arrow 1 on FIG. 10, and thereby to turn lever 209 in the counter-clockwise direction about pivot Z. The turning of lever 209 brings gear 212 into meshing engagement with the gear 211 rotated with capstan 202, and thus gear 212 is rotated in the clockwise direction for causing actuating member 214 to pivot shut-off member 215, as previously described. It will be apparent that, in the case where the automatic shut-off mechanism is operated to halt the tape drive in response to the full unwinding of the tape from the supply reel, such fact is thereafter evident from the disposition of all of the push-buttons 112a–112g in their inactive positions.

FIG. 11 is a circuit diagram interdependent relationship between the phonograph record player 103 and the recorder device 104. A motor 135 is connected between the power source terminal +B and the ground through a movable contact Q and one fixed contact P of a changeover switch 114a and the aforesaid switch A1 provided on the side of the record player 103. Further, the motor 135 is connected between the terminal +B and the ground through the contact Q and the other fixed contact R of the changeover switch 114a and through a switch 112'. When a control 114 is switched to its one position to achieve an interdependent operation of the record player 103 and the recorder 104, the contact Q of the changeover switch 114a makes contact with the contact P. When the control 114 is switched to the other position to provide the independent operation of the record player 103 and the recorder 104, the contact Q makes contact with the contact R. A switch 112' is closed when a forward push-button 112d is provided on the side of the recorder 104 is pressed to drive a tape 208 in the forward direction.

In the circuit of FIG. 11 showing the interdependent relationship, the content of record 151 obtained from the pickup of the record player 103 is supplied to the input side of an amplifier AM through the fixed contact P and the movable contact Q of a changeover switch 114b, while one portion of the output from the amplifier AM is supplied directly to a speaker SP and to the magnetic head 136 of the recorder 104 through the aforesaid switch A2 provided on the side of the record player 103. Accordingly, the magnetic head 136 is actuated for recording to record the content of record 151 on the tape 208. The input side of the amplifier AM is connected to the magnetic head 136 through the movable contact Q and the fixed contact R of the switch 114b, so that the output reproduced by the magnetic head 136 is supplied to the speaker SP through the amplifier AM. The changeover switch 114b is ganged with the aforesaid one 114a.

INTERDEPENDENT OPERATION OF PHONOGRAPH RECORD PLAYER 103 AND TAPE RECORDER 104

When the content of phonograph record 151 on turntable 150 of phonograph record player 103 is to be recorded on magnetic tape 208 in tape recorder 104, control 113 (FIG. 5) is actuated to close the respective switch by which power is supplied to the terminals +B on FIG. 11 and control 114 is actuated for contacting the contacts Q of the switches 114a and 114b to the contact P thereof, as shown in FIG. 11. After the cassette 130 is located in recess 111 of tape recorder 104, push-buttons 112b and 112d are simultaneously depressed to select the normal-forward operating mode and recording state of tape recorder 104. Since the switches A1 and A2 are in their open condition when the record player 103 is not reproducing the content of record 151, the motor 135 of the recorder 104 is supplied with no power, and hence is not driven. Accordingly, in the recorder 104, the magnetic head 136 is in contact with the tape 208 but the tape 208 is not driven. Thereafter, when the tone arm 107 is manually removed from the arm rest 250 and disposed to engage the stylus 107' with a desired portion of the record groove of record 151, the switches A1 and A2 are closed. The switch A1 is actuated in the time interval until the stylus 107' engages the record 151 after starting of the movement of the tone arm 101, whereby the recorder is conditioned for recording when the stylus engages the record to play it. As a result of this, the motor 135 of the recorder 104 is driven to drive the tape 208 in the forward direction. Since the record 151 is rotating when the tone arm 107 is disposed to engage the stylus 107' with the groove of record 151, the content of record 151 is provided from the pickup 107b. Consequently, the content of record 151 is supplied to the magnetic head 136 through the switch 114b and the amplifier AM and is recorded on the tape 208. At this time, the content of record 151 is monitored by the speaker SP. Accordingly, if the control 114 is preset in the state of providing the interdependent operation that the contacts Q of the switches 114a and 114b make contact with the contact P, placing of the tone arm 107 to play the content of record 151 on the side of the record player 103 will automatically record the content of record 151 on the tape 208 of the recorder 104 and no difficulty is introduced in this operation. Upon completion of playing of the content of record 151 in the record player 103, the tone arm 107 is automatically returned to its rest position and the switches A1 and A2 are opened. Even if the cuing control lever 108 or the reject control lever 109 is actuated prior to completion of the playing of the record 151, the tone arm 107 is returned to its rest position and the switches A1 and A2 are opened. When the switches A1 and A2 are opened, the motor 135 of the recorder 104 is stopped and, at the same time, the amplifier AM is cut off the magnetic head 136. Consequently, the record mode of the content of record 151 is finished.

Though not described in detail, if the control 114 is preset in such a state of providing the independent operation that the contacts Q of the switches 114a and 114b make contact with the contact R, the mode of recording the content of record 151 on the tape 208 is not provided. Where the control 114 is preset in the state of providing the independent operation, if the forward button 112d of the recorder 104 is pressed, the signal recorded on the tape 208 is reproduced and is monitored with the speaker SP.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of this invention, as defined in the appended claims.

We claim:

1. A combined phonograph record player and magnetic tape recorder for recording on a tape the content of a phonograph record in which the phonograph record player includes a switch which is closed by a starting action of the phonograph record player before playing of the record is started for playing the content thereof and the magnetic tape recorder includes a motor for driving it, the motor being connected to a power source through the switch.

2. A combined phonograph record player and magnetic tape recorder for recording on a tape the content of a phonograph record in which the phonograph record player includes a tone arm, a stylus carried by the tone arm, and a switch which is closed by a starting action of the phonograph record player for playing the content thereof and the magnetic tape recorder includes a motor for driving it, the motor being connected to a power source through the switch which is actuated in the time interval until the stylus engages the record after starting of the movement of the tone arm, whereby the recorder is conditioned for recording when the stylus engages the record to play it.

* * * * *